United States Patent
Otaguro et al.

(10) Patent No.: US 6,218,072 B1
(45) Date of Patent: Apr. 17, 2001

(54) OPTICAL INFORMATION RECORDING MEDIUM

(75) Inventors: Kunihiro Otaguro; Mitsue Sakaino; Satoshi Nagaya; Toru Fujii; Yoshikazu Takagishi, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/195,541

(22) Filed: Nov. 19, 1998

(30) Foreign Application Priority Data

Nov. 20, 1997 (JP) .................................................. 9-334828
Aug. 27, 1998 (JP) ................................................ 10-256110

(51) Int. Cl.$^7$ .................................................... B41M 5/26
(52) U.S. Cl. .............. 430/270.21; 430/945; 430/270.19; 430/270.16; 369/283; 369/288; 428/64.8
(58) Field of Search ...................... 428/64.8; 430/270.19, 430/270.16, 270.2, 270.21, 270.15, 945; 369/283, 288

(56) References Cited

U.S. PATENT DOCUMENTS

| | | | |
|---|---|---|---|
| 4,412,231 | * 10/1983 | Namba et al. | 430/945 |
| 4,735,889 | * 4/1988 | Namba et al. | 430/270.19 |
| 4,737,443 | * 4/1988 | Niwa et al. | 430/945 |
| 4,873,332 | 10/1989 | Yoshida et al. | 546/7 |
| 4,954,420 | * 9/1990 | Maeda et al. | 430/270.16 |
| 4,990,433 | * 2/1991 | Yoshida et al. | 430/270.16 |
| 5,075,146 | * 12/1991 | Satake et al. | 428/64.8 |
| 5,536,548 | * 7/1996 | Koji et al. | 428/64.8 |
| 5,633,106 | * 5/1997 | Aihara et al. | 430/270.2 |
| 5,679,430 | * 10/1997 | Shiankai et al. | 428/64.8 |
| 5,892,042 | * 4/1999 | Ohashi et al. | 430/270.16 |

FOREIGN PATENT DOCUMENTS

| | | | |
|---|---|---|---|
| 0310027 A2 | 4/1989 | (EP) . | |
| 0458257 A2 | 11/1991 | (EP) . | |
| 0483387 A1 | 5/1992 | (EP) . | |
| 57-011090 | 1/1982 | (JP) . | |
| 61-041597 | * 2/1986 | (JP) | 430/270.15 |
| 61-227492 | * 12/1986 | (JP) | 430/270.19 |
| 63-276593 | * 11/1988 | (JP) | 430/270.16 |
| 63-303794 | * 12/1988 | (JP) | 430/270.21 |
| 1-216966 | * 8/1989 | (JP) | 430/270.16 |
| 4141493 | 5/1992 | (JP) . | |
| 4-202260 | * 7/1992 | (JP) | 430/270.16 |
| 5-169837 | * 7/1993 | (JP) | 430/270.16 |
| 7196588 | 8/1995 | (JP) . | |
| 9175015 | 7/1997 | (JP) . | |
| 10-182651 | * 7/1998 | (JP) | 430/270.16 |

OTHER PUBLICATIONS

Optical Information–Recording Medium; Ricoh Co., Ltd.: Abe Michiharu;Publication No: 61277492; Publication Date: Aug. 12, 1986.

* cited by examiner

*Primary Examiner*—Martin Angebranndt
(74) *Attorney, Agent, or Firm*—Birch, Stewart, Kolasch & Birch, LLP

(57) ABSTRACT

An optical information recording medium provided on a substrate thereof with a recording layer comprising a dye-containing layer, wherein the recording layer further comprises an organometallic dye compound containing a metal or a metallic ion, which is characterized in that an absorption spectrum curve of the recording organic dye is intersected with an absorption spectrum curve of the organometallic dye compound, and that the organometallic dye compound exhibits a maximum absorption wavelength on a longer wavelength side in relative to a maximum absorption wavelength of the recording organic dye.

16 Claims, 22 Drawing Sheets

OPTICAL INFORMATION RECORDING MEDIUM

BACKGROUND OF THE INVENTION

This invention relates to an optical information recording medium of heat mode write-once type such as CD-R, DVD-R, which is capable of recording or reproducing a data by means of a laser beam, and in particular to an optical information recording medium of write once type, which is improved in light stability.

The CD-R is well known as the means for recording and reproducing video data such as images of character and graphic or audio data such as music. The CD-R now available is formed of an optical disk, which is capable of recording and reproducing with a laser beam of 770 to 830 nm in wavelength.

Recently however, DVD-R (a digital video disk-recordable or a digital versatile disk-recordable) which is capable of recording and reproducing in high density by means of a red laser beam of 620 to 690 nm in wavelength for instance, i.e. a wavelength which is shorter than that of the laser beam employed in the aforementioned CD-R, is now being propagated as new media of the next generation.

As a disk for an optical information recording medium of heat mode write-once type such as CD-R, DVD-R, a pits-forming type optical disk comprising a recording layer containing an organic dye such as cyanine for enabling pits to be formed therein upon irradiation of recording light has been employed. This cyanine dye is advantageous in that it can be applied thereon by a method which is high in productivity such as a spin-coating method, that it is excellent in oxidation resistance, and that it can be locally heated since the heat conductivity thereof is low. In particular, this cyanine dye has been attracting an attention because it exhibits a high absorbancy and reflectivity in a wavelength region of semiconductor laser.

Generally however, the cyanine dye is not sufficiently resistive against sunlight. In order to overcome this problem, various measures have been taken wherein a stabilizing radical or a bonded body consisting of a cyanine dye cation and a quencher anion is generally added to the main component of a cyanine dye exhibiting absorption characteristics to the oscillating wavelength of semiconductor laser so as to transform singlet oxygen generated from sunlight and causing the discoloration of the cyanine dye into triplet oxygen which is more mild in oxidizing effect than the singlet oxygen thereby to improve the light stability of the cyanine-containing layer of CD-R or DVD-R. However, if it is desired to preserve the contents of record for a long period of time as in the case of an encyclopedia for instance, the aforementioned measures are not sufficiently effective, so that there is a strong demand for countermeasures which are capable of preventing a stored data from being photo-degraded for a long period of time.

There has been conventionally proposed the employment of an aluminum salt as a compound which is capable of preventing such a photo-degradation (Japanese Patent Unexamined Publication H7-196588). However, the aluminum salt is poor under the conditions of high temperature and high humidity (for example, 80° C. in temperature and 70% in relative humidity). The employment of nickel dithiol has been also proposed (Japanese Patent Unexamined Publication S57-11090). Although an improvement in some degree of light stability may be expected by the employment of nickel dithiol, the effect thereof is still satisfactory. Particularly when these compounds are employed as a recording medium (DVD-R) for recording or reproducing of data using a short wavelength laser (600 to 630 nm), the photo-degradation-preventing effect thereof is reduced.

Meanwhile, indoaniline derivatives are known to be useful as a dye capable of absorbing near-ultraviolet ray, and hence an information-recording medium employing these compounds as a dye has been also proposed (for example, Japanese Patent Unexamined Publications H4-141493 and H9-175015). According to these documents, the indoaniline derivatives are employed simply as a dye for a recording layer and are not employed as a light stabilizer for improving the light resistance of another kind of dye to be employed in combination with these indoaniline derivatives. In particular, Japanese Patent Unexamined Publication H9-175015 discloses an optical tape medium whose recording layer is improved in light resistance by the employment of an indoaniline derivative. However, the end-use of the indoaniline derivatives described therein is limited to an optical tape medium, i.e. the employment of the indoaniline derivatives for an optical disk is not suggested at all. Furthermore, this document simply teaches that the light resistance of the recording layer can be obtained when these indoaniline derivatives are employed singly as a dye, and hence a technical idea of employing these indoaniline derivatives as a light stabilizer together with another kind of dye for improving the light resistance of said another kind of dye is not suggested at all in this document. Moreover, these indoaniline derivatives are simply exemplified as a dye suited for use for the recording using a laser of 700 to 900 nm in wavelength together with a large number of other kinds of dyes. Thus, nothing is taught or suggested in this prior document about the technical idea of using these indoaniline derivatives as a light stabilizer together with another kind of dye in the recording and reproducing of data using a laser of 600 to 660 nm in wavelength, or using these indoaniline derivatives as a sole dye for improving the light resistance of the recording layer in the recording and reproducing of data using a laser of 600 to 660 nm in wavelength.

BRIEF SUMMARY OF THE INVENTION

Therefore a first object of this invention is to provide an optical information recording medium which is capable of preventing the photo-degradation of recording layer and also capable of retaining the recording and reproducing performances during a long period of storage.

A second object of this invention is to provide an optical information recording medium which makes use of an organometallic dye compound for reducing the sunlight absorption energy of a heat mode recording dye, thereby preventing the dye from being degraded.

A third object of this invention is to provide an optical information recording medium which makes it possible to dispense with the employment of a light stabilizer such as a stabilizing radical or a quencher.

A fourth object of this invention is to provide an optical information recording medium which can be manufactured by applying the conventional method of manufacturing CD-R or DVD-R without extensively modifying the conventional method.

The present inventors have made an intensive study to solve the aforementioned problems and noticed to utilize a known phenomenon that when a couple of absorption curves each having a maximum absorption peak indicating a light absorption spectrum are intersected with each other, a portion of the maximum absorption energy region of shorter wavelength side is caused to shift toward the maximum absorption energy region of longer wavelength side (Nicholas J, Turro; Modern Molecular Photochemistry: The Benjamin/Cummings Publishing Co., Inc., pp.296–298). Thus, the present inventors have found it possible to prominently minimize the discoloring degradation, due to light, of cyanine dyes or to improve the light stability of cyanine dyes by mixing cyanine dyes with a derivative of an organic dye containing a metal or a metallic ion and being suitably controlled in maximum absorption wavelength thereof, i.e. with a metallic chelate compound, thus accomplishing this invention.

Namely, the aforementioned problems has been overcome according to this invention by providing; (1) an optical information recording medium provided on a substrate thereof with a light interference layer comprising a dye-containing layer, wherein said dye-containing layer contains a heat mode recording organic dye and said light interference layer contains an organometallic dye compound containing a metal or a metallic ion (excluding a situation where only pyridophenothiazine derivatives, quinolinedione derivatives, naphthoquinolinedione derivatives or naphthoquinone derivatives are existed), which is characterized in that an absorption spectrum curve of said recording organic dye is intersected with an absorption spectrum curve of said organometallic dye compound, and that said organometallic dye compound exhibits a maximum absorption wavelength on a longer wavelength side in relative to a maximum absorption wavelength of said recording organic dye.

This invention further provides (2) an optical information recording medium as set forth in (1), wherein said recording organic dye is a cyanine dye.

This invention further provides (3) an optical information recording medium as set forth in (2), wherein said cyanine dye is a compound represented by the following general formula [1]:

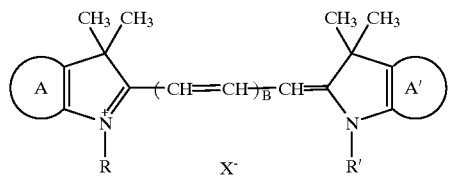

[1]

wherein "A" represents any one of the following general formulas [2], [3], [4] and [5];

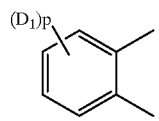

[2]

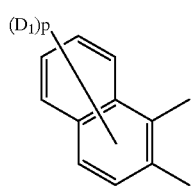

[3]

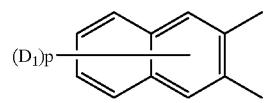

[4]

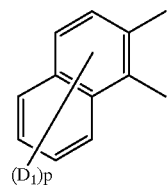

[5]

wherein "A'" represents any one of the following general formulas [6], [7], [8] and [9];

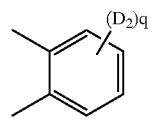

[6]

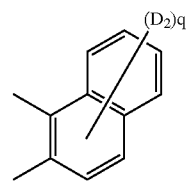

[7]

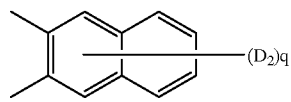

[8]

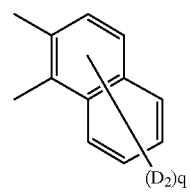

[9]

wherein "A" and "A'" may be the same or different from each other (where D1 and D2 may be the same or different from each other and are individually hydrogen atom, alkyl, alkoxy, hydroxyl, halogen atoms, carboxyl, alkoxycarboxyl, alkylcarboxyl, alkylhydroxyl, aralkyl, alkenyl, alkylamide, alkylamino, alkylsufonamide, alkylcarbamoyl, alkylsulfamoyl, alkylsulfonyl, phenyl, cyano, ester, nitro, acyl, allyl, aryl, aryloxy, alkylthio, arylthio, phenylazo, pyridinoazo, alkylcarbonylamino, sulfonamide, amino, alkylsulfone, thiocyano, mercapt, chlorosulfone, alkylazomethine, alkylaminosulfone, vinyl or sulfone group; p and q respectively represents an integer of 1 or more); R and R' may be the same or different from each other and are individually substituted or unsubstituted alkyl, carboxyl, alkoxycarbonyl, alkoxycarboxyl, alkoxyl, alkylhydroxyl, aralkyl, alkenyl, alkylamide, alkylamino, alkylsufonamide, alkylcarbamoyl, alkylsulfamoyl, hydroxyl, halogen atoms, alkylalkoxyl, alkyl halide, alkylsulfonyl, alkylcarboxyl or alkylsulfonyl which are bonded to a metallic ion or alkyl, phenyl, benzyl or alkylphenyl group; X— is an anion selected from the group consisting of halogen atoms, PF6-, SbF6-, H3PO4, perchloric acid, hydroborofluoric acid, benzenesulfonic acid, toluenesulfonic acid, alkylsulfonic acid, benzenecarboxylic acid, alkylcarboxylic acid, trifluoromethylcarboxylic acid, periodic acid and SCN−; and B is an integer of 1, 2 or 3.

This invention further provides (4) an optical information recording medium as set forth in any one of the aforementioned (1), (2) and (3), wherein said metal or metallic ion is constituted by a transition metal.

This invention further provides (5) an optical information recording medium as set forth in any one of the aforementioned (1), (2) and (3), wherein said metal or metallic ion is constituted by at least one kind of metal or metallic ion selected from the group consisting of Ni, Cu, Mn, Co, V, Mo and Fe; and said organometallic dye compound is a naphthalenone derivative.

This invention further provides (6) an optical information recording medium as set forth in any one of the aforementioned (1), (2) and (3), wherein said metal or metallic ion is constituted by at least one kind of metal or metallic ion selected from the group consisting of Ni, Cu, Mn, Co, V, Mo and Fe; and said organometallic dye compound is constituted by a naphthalenone derivative and a pyridophenothiazine derivative.

This invention further provides (7) an optical information recording medium as set forth in the aforementioned (5) or (6), wherein said metal or metallic ion is constituted by at least one kind of metal or metallic ion selected from the group consisting of Ni, Cu, Mn, Co, V, Mo and Fe; and said naphthalenone derivative is constituted by a naphthalenone derivative is a compound represented by the following general formula [30]:

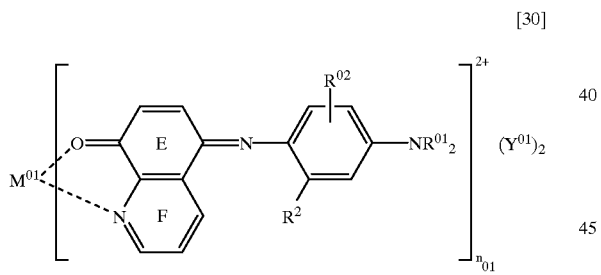

[30]

wherein $M^{01}$ is a metal or a metallic ion selected from the group consisting of Ni, Cu, Mn, Co, V, Mo and Fe; E and F may be provided with a substituent group; $R^{01}$s of $R^{01}_2$ may be the same or different from each other and are individually hydrogen atom, lower alkyl group, alkoxy group, alkenyl group or cycloalkyl group, each accompanying or not accompanying a substituent group; $R^{02}$ is hydrogen atom, halogen atom, lower alkyl group, alkoxy group, alkylsulfonyl amino group, alkoxycarbonyl amino group, or acylamino group, each accompanying or not accompanying a substituent group; $Y^{01}$ represents an anion selected from the group consisting of halogen ion, $ClO_4^-$, $BF_4^-$, $PF_6^-$, $SbF_6^-$, $NO_3^-$, $CH_3COO^-$, $SO_4^{--}$, $ArSO_3^-$ (Ar is a substituted or unsubstituted aromatic ring), $RSO_3^-$ (R is a substituted or unsubstituted lower alkyl group); and $n_{01}$ is an integer of 1 or 2.

This invention further provides (8) an optical information recording medium as set forth in the aforementioned (7), wherein said compound represented by the general formula [30] is a compound represented by the following general formula [10]:

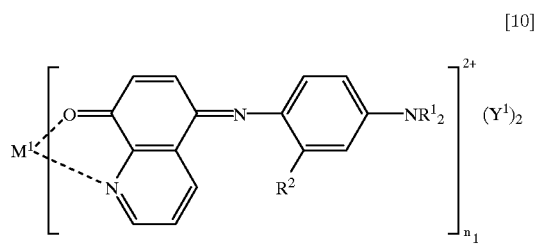

[10]

wherein $M^1$, $R^1$ of $R^1_2$, $R^2$, $Y^1$ and $n_1$ are the same in definition as those of $M^{01}$, $R^{01}$ of $R^{01}_2$, $R^{02}$, $Y^{02}$ and $n_{01}$ of the aforementioned general formula [30], respectively.

This invention further provides (9) an optical information recording medium as set forth in the aforementioned (8), wherein said compound represented by the general formula [10] is selected from those where $R^1$s of $R^1_2$ are the same or different from each other and are individually lower alkyl group such as ethyl; $R^2$ is hydrogen atom or lower alkyl group such as methyl; and $Y^1$ is a compound representing an anion selected from the group consisting of halogen ion, $ClO_4^-$, $BF_4^-$, $PF_6^-$ and $SbF_6^-$.

This invention further provides (10) an optical information recording medium as set forth in the aforementioned (7), wherein said compound represented by the general formula [30] is a compound represented by the following general formula [11]:

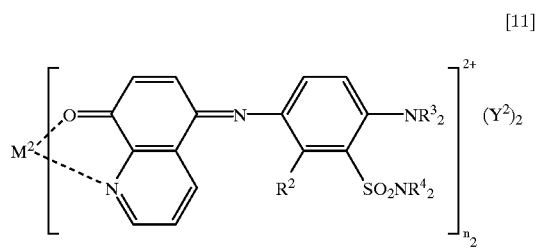

[11]

wherein $M^2$, $R^3$ of $R^3_2$, $Y^2$ and $n_2$ are the same in definition as those of $M^{01}$, $R^{01}$ of $R^{01}_2$, $Y^{01}$ and $n_{01}$ of the aforementioned general formula [30], respectively; and $R^4$s of $R^4_2$ are the same or different from each other and are individually lower alkyl group such as ethyl.

This invention further provides (11) an optical information recording medium as set forth in the aforementioned (10), wherein said compound represented by the general formula [11] is selected from those where $R^3$s of $R^3_2$ are the same or different from each other and are individually lower alkyl group such as ethyl; and $Y^2$ is a compound representing an anion selected from the group consisting of halogen ion, $ClO_4^-$, $BF_4^-$, $PF_6^-$ and $SbF_6^-$.

This invention further provides (12) an optical information recording medium as set forth in any one of the aforementioned (6) to (11), wherein said pyridophenothiazine derivative is constituted by a compound represented by the following general formula [12]:

[12]

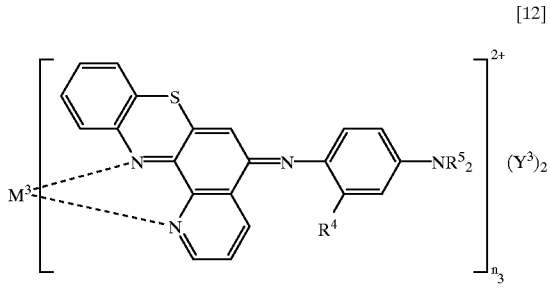

wherein $M^3$ is a metal or a metallic ion selected from the group consisting of Ni, Cu, Mn, Co, V, Mo and Fe; $R^5$s of $R^5{}_2$ may be the same or different from each other and are individually lower alkyl group such as ethyl; $R^6$ is hydrogen atom, lower alkyl group such as methyl; $Y^3$ represents an anion selected from the group consisting of halogen ion, $ClO_4^-$, $BF_4^-$, $PF_6^-$ and $SbF_6^-$; and $n_3$ is an integer of 1 or 2.

This invention further provides (13) an optical information recording medium as set forth in the aforementioned (5), wherein said metal or metallic ion is constituted by at least one kind of metal or metallic ion selected from the group consisting of Ni, Cu, Mn, Co, V, Mo and Fe; and said naphthalenone derivative is a compound represented by the following general formula [31]:

[31]

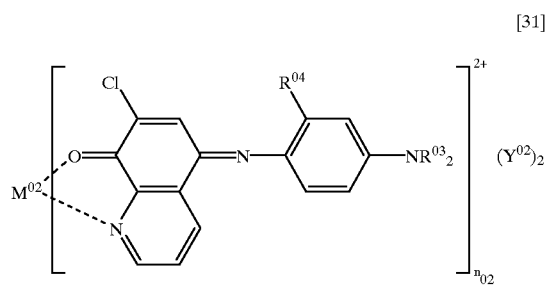

wherein $M^{02}$, $R^{03}$ of $R^{03}{}_2$, $R^{04}$, $Y^{02}$ and $n_{02}$ are the same in definition as those of $M^{01}$, $R^{01}$ of $R^{01}{}_2$, $R^{02}$, $Y^{01}$ and $n_{01}$ of the aforementioned general formula [30], respectively.

This invention further provides (14) an optical information recording medium as set forth in any one of the aforementioned (1) to (13), wherein said recording medium is an optical disk which is capable of recording or reproducing data by means of laser beam of 620 to 690 nm in wavelength.

The light interference layer in this invention can be formed so as to enable the recording and reproducing to be performed with a laser beam ranging from 770 nm to 830 nm in wavelength. In this case, the light interference layer can be employed for the CD-R. However, it is also possible to form the light interference layer so as to enable the recording and reproducing to be performed with a laser beam ranging from 620 nm to 690 nm in wavelength. In this case, the light interference layer can be employed for the DVD-R.

The expression of the "interference layer" employed in this invention is a generic term which is intended to include not only the recording layer constituted by a single or plural dye layers containing an organic color material and also by an additional layer formed of an organic or inorganic material so as to enable pits to be formed in the recording layer with the irradiation of laser beam, but also an enhancing layer formed of a resin for instance and having an adjusted refractive index or film thickness for the purpose of adjusting the optical property of the optical information recording medium, or an intermediate layer to be interposed between the substrate and the dye layer, between the dye layers if the dye layer is constituted by plural layers, or to be disposed over the dye layer.

Further, by the term, "heat mode recording organic dye" employed in this invention, it is intended to include all kinds of organic dyes whose layers enable pits to be formed therein by the irradiation of a recording laser beam to be employed for CD-R or DVD-R, thereby to perform a recording. Examples of such heat mode recording organic dye include cyanine dye, phthalocyanine dye, azo metallic compound dye, etc.

Among these organic dyes, the cyanine dye is deemed to be poor in light stability to sunlight, so that it is very significant to improve the light stability thereof. However, the compounds represented by the aforementioned general formula [1] can be employed as the cyanine dye. In particular, a trimethine-based cyanine dye where B is 1 in the aforementioned general formula [1] can be effectively employed for the DVD-R. On the other hand, a pentamethine-based cyanine dye and heptamethine-based cyanine dye where B is 2 or 3 in the aforementioned general formula [1] can be effectively employed for the CD-R.

According to this invention, an organometallic dye compound containing a metal or a metallic ion is co-used with the aforementioned heat mode recording organic dye. In this case, the organometallic dye compound may be incorporated into a recording organic dye layer or into another layer constituting a light interference layer. As for the metal or metallic ion, a transition metal or an ion thereof is preferable. For example, the metal or metallic ion may be at least one kind of metal or metallic ion selected from the group consisting of Ni, Cu, Mn, Co, V, Mo and Fe. As for the organometallic dye compound, one kind or two or more kinds of the organometallic dye (excluding the case where quinolinedione derivatives, naphthoquinolinedion derivatives, naphthoquinone derivatives and pyridophenothiazine derivatives are employed singly (even though these derivatives may be employed singly in the same manner, it constitutes a different invention)) may be employed. For example, naphthalenone derivatives (indoaniline derivatives) and other kinds of derivative exhibiting an absorption spectrum curve which intersects with the absorption spectrum curve of the recording organic dye and a maximum absorption wavelength which is positioned on a longer wavelength side in relative to a maximum absorption wavelength of the recording organic dye.

These organometallic dyes may be employed singly (each organometallic dye may be employed in the form of single kind or plural kinds), in combination with at least one kind of the above exemplified derivatives such as quinolinedione derivative or with at least one kind of said other kinds of derivative, or in combination with at least two kinds of the above exemplified derivatives or with at least two kinds of said other kinds of derivative.

As for the naphthalenone derivatives, the compounds represented by the aforementioned general formula [30], more specifically the compounds represented by the aforementioned general formulas [10], [11] and [31] may be employed. Still further specific examples of the naphthalenone derivatives are those shown in the following Examples and the like.

The E and F in the aforementioned general formula [30] may be accompanied with a substituent group, such as a halogen atom such as chlorine atom. Specific preferable example of such compounds are those represented by the aforementioned general formula [31].

As for the pyridophenothiazine derivatives that can be co-used with the aforementioned naphthalenone derivatives, quinolinedione derivatives, naphthoquinolinedione derivatives, naphthoquinone derivatives or said other kinds of derivative, the compounds represented by the aforementioned general formula [12] may be employed.

As for the quinolinedione derivatives that can be co-used with the aforementioned naphthalenone derivatives, pyridophenothiazine derivatives, naphthoquinolinedione derivatives, naphthoquinone derivatives or said other kinds of derivative, the compounds represented by the following general formula [13], more specifically the compounds represented by the following general formulas [14] and [15] may be employed.

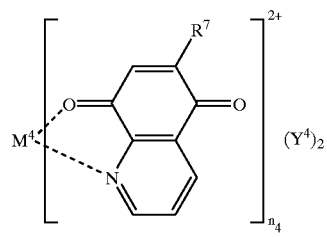

[13]

wherein $M^4$ is a metal or a metallic ion selected from the group consisting of Ni, Cu, Mn, Co, V, Mo and Fe; $R^7$ is aminophenyl group or aminophenyl-substituted amino group; $Y^4$ represents an anion selected from the group consisting of halogen ion, $ClO_4^-$, $BF_4^-$, $PF_6^-$ and $SbF_6^-$; and $n_4$ is an integer of 1 or 2.

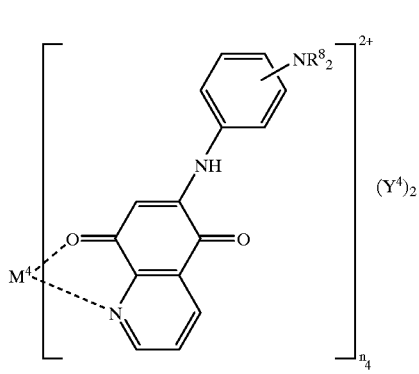

[14]

wherein $M^4$, $Y^4$ and $n_4$ are the same in definition as those explained in the aforementioned general formula [13]; and $R^8$s of $R^8_2$ may be the same or different from each other and are individually lower alkyl group such as methyl.

A specific example of these compounds is a compound where $M^4$ is Cu, $NR^8_2$ is located at the para-position and $R^8$s of $R^8_2$ are both constituted by methyl group, $Y^4$ is $ClO_4^-$, and $n_4$ is 2, i.e. ($C_{34}H_{30}N_6O_{12}Cl_2Cu$: 848.5 in molecular weight). A 99% ethanol solution of this compound exhibits a maximum absorption wavelength of 704 nm (ε (molecular absorption coefficient, the same hereinafter)=19,900).

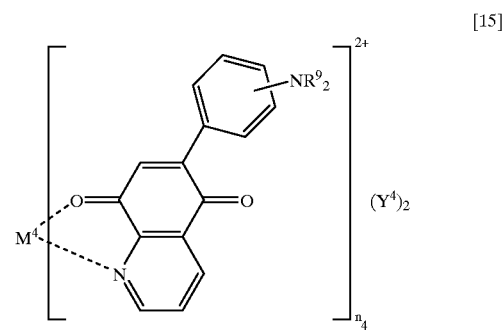

[15]

wherein $M^4$, $Y^4$ and $n_4$ are the same in definition as those explained in the aforementioned general formula [13]; and $R^9$s of $R^9_2$ may be the same or different from each other and are individually lower alkyl group such as methyl.

A specific example of these compounds is a compound where $M^4$ is Cu, $NR^9_2$ is located at the para-position and $R^9$s of $R^9_2$ are both constituted by methyl group, $Y^4$ is $ClO_4^-$, and $n_4$ is 2, i.e. ($C_{34}H_{28}N_4O_{12}Cl_2Cu$: 818.5 in molecular weight). An ethanol solution of this compound exhibits a maximum absorption wavelength of 760 nm (ε=49,200).

As for the naphthoquinolinedione derivatives that can be co-used with the aforementioned naphthalenone derivatives, pyridophenothiazine derivatives, quinolinedione derivatives, naphthoquinone derivatives or said other kinds of derivative, the compounds represented by the following general formula [16] may be employed.

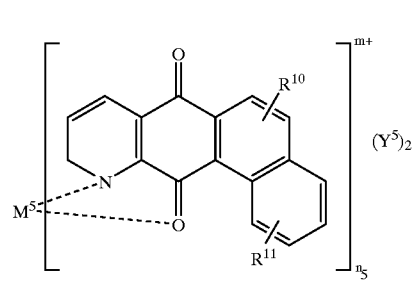

[16]

wherein $M^5$ is a metal or a metallic ion selected from the group consisting of Ni, Cu, Mn, Co, V, Mo and Fe; $R^{10}$ is lower alkyl group, phenyl group or aminophenyl group (φ—$NR^{12}_2$ ($R^{12}$s of $R^{12}_2$ may be the same or different from each other and are individually lower alkyl group, and φ is benzene ring); $R^{11}$ is lower alkyl group, or lower alkyl (e.g. methyl)-substituted amino group; $Y^5$ represents an anion selected from the group consisting of halogen ion, $ClO_4^-$, $BF_4^-$, $PF_6^-$ and $SbF_6^-$; and $n_5$ is an integer of 1 or 2; and m is an integer of 1 or 2.

Specific examples of the naphthoquinolinedione derivatives are the compounds represented by the following general formula [17].

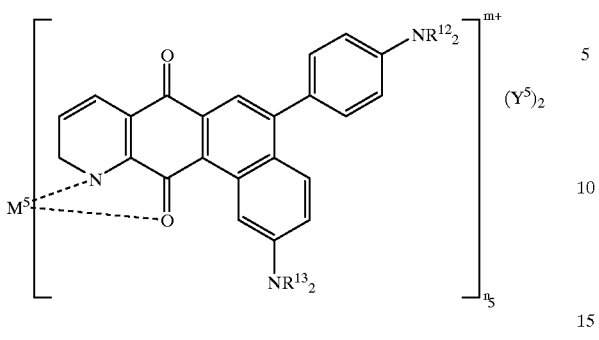

wherein $M^5$, $Y^5$, $n_4$, $R^{12}$ and m are the same in definition as those explained in the aforementioned general formula [16]; and $R^{13}$s of $R^{13}_2$ may be the same or different from each other and are individually lower alkyl group such as methyl.

A specific example of these compounds is a compound where $M^5$ is Cu. $R^{12}$s of $R^{12}_2$ are both constituted by methyl group, $R^{13}$s of $R^{13}_2$ are both constituted by methyl group, $Y^5$ is $ClO_4^-$, and $n_5$ is 2, i.e. ($C_{54}H_{46}N_6O_{12}Cl_2Cu$, $C_{27}H_{23}N_3O_{10}Cl_2Cu$: 683.5 in molecular weight). A tetrahydrofuran solution of this compound exhibits a maximum absorption wavelength of 794 nm ($\epsilon$=26,900).

As for the naphthoquinone derivatives that can be co-used with the aforementioned naphthalenone derivatives, pyridophenothiazine derivatives, quinolinedione derivatives, naphthoquinolinedione derivatives or said other kinds of derivative, the compounds represented by the following general formula [18], more specifically the compounds represented by the following general formulas [19], [20] and [21] may be employed.

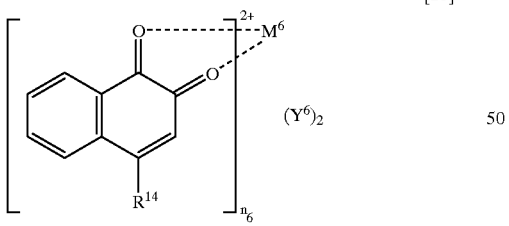

wherein $M^6$ is a metal or a metallic ion selected from the group consisting of Ni, Cu, Mn, Co, V, Mo and Fe; $R^{14}$ is aminophenyl group, aminophenyl-substituted amino group or aminophenyl-substituted ethenyl group; $n_4$ is an integer of 1 or 2; and $Y^6$ represents an anion selected from the group consisting of halogen ion, $ClO_4^-$, $BF_4^-$, $PF_6^-$ and $SbF_6^-$.

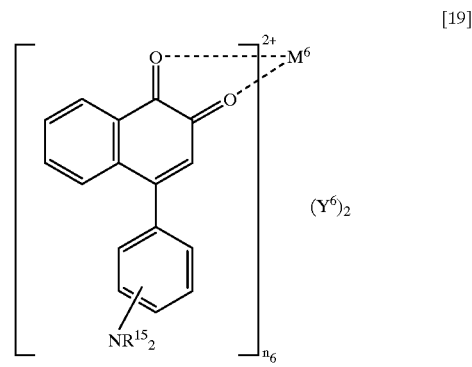

wherein $M^6$, $n_6$ and $Y^6$ are the same in definition as those explained in the aforementioned general formula [18]; and $R^{15}$s of $R^{15}_2$ may be the same or different from each other and are individually lower alkyl group such as ethyl.

A specific example of these compounds is a compound where $M^6$ is Ni, $n_6$ is 1, $Y^6$ is $ClO_4^-$, $NR^{15}_2$ is located at the para-position and $R^{15}$s of $R^{15}_2$ are both constituted by ethyl group, i.e. ($C_{20}H_{19}NO_{10}Cl_2Ni$: 562.7 in molecular weight). An ethanol solution of this compound exhibits a maximum absorption wavelength of 817 nm ($\epsilon$=24,200).

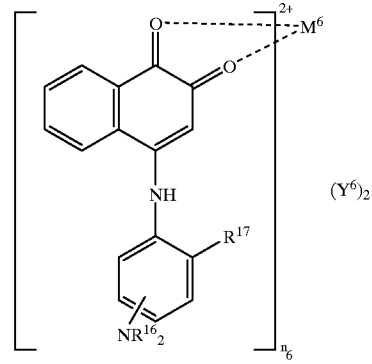

wherein $M^6$, $n_6$ and $Y^6$ are the same in definition as those explained in the aforementioned general formula [18]; $R^{16}$s of $R^{16}_2$ may be the same or different from each other and are individually lower alkyl group such as ethyl; and $R^{17}$ is hydrogen atom or lower alkyl group such as methyl.

A specific example of these compounds is a compound where $M^6$ is Cu, $n_6$ is 2, $Y^6$ is $ClO_4^-$, $NR^{16}_2$ is located at the para-position and $R^{16}$s of $R^{16}_2$ are both constituted by ethyl group, and $R^{17}$ is methyl, i.e. ($C_{42}H_{46}N_4O_{12}Cl_2Cu$: 932.2 in molecular weight). An ethanol solution of this compound exhibits a maximum absorption wavelength of 717 nm ($\epsilon$=15,200).

[21]

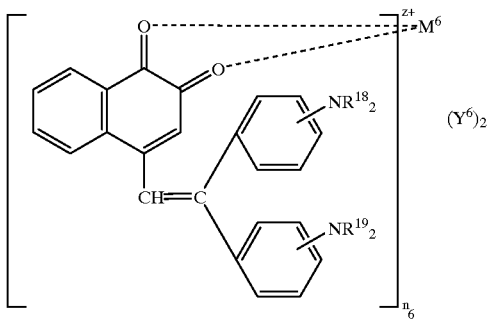

wherein $M^6$, $n_6$ and $Y^6$ are the same in definition as those explained in the aforementioned general formula [18]; $R^{18}$s of $R^{18}_2$ and $R^{19}$s of $R^{19}_2$ may be individually the same or different from each other and are individually lower alkyl group such as methyl.

A specific example of these compounds is a compound where $M^6$ is Ni, $n_6$ is 1, $Y^6$ is $ClO_4^-$, $NR^{18}_2$ and $NR^{19}_2$ are respectively located at the para-position and $R^{18}$s of $R^{18}_2$ and $R^{19}$s of $R^{19}_2$ are both constituted by methyl group, and $R^{19}$ is methyl, i.e. ($C_{28}H_{26}N_2O_{10}Cl_2Ni$: 680 in molecular weight). An ethanol solution of this compound exhibits a maximum absorption wavelength of 734 nm ($\epsilon$=37,500).

Halogen means in this invention a halogen element such as chlorine, bromine, iodine, etc.

Cyanine dye is generally represented by a formula: $R-(CH=CH)_n-CH=R^+$. It is considered that as the number of the integer n representing the number of vinyl group which is located at the center is increased, the maximum absorption wavelength of the dye is shifted toward the deep color side (bathochromic shift). In this case, since the color is deepened by about 100 nm increments as the number of n is increased, the organometallic dye compound to be employed in this invention should preferably be selected from those whose absorption wavelength falls in an optimum region, so as to render, when the organometallic dye compound is co-used with a cyanine dye, the absorption spectrum curve of the organometallic dye compound to be intersected with the absorption spectrum curve of cyanine dye, and also to render the maximum absorption wavelength of the organometallic dye compound to be existed on a longer wavelength side in relative to the maximum absorption wavelength of the cyanine dye. When the organometallic dye compound and the cyanine dye a reselected in this manner, the discoloring degradation of cyanine dye can be prevented by the effect of the organometallic dye compound, thus easily inhibiting the cyanine dye from being discolored or degraded.

Since the organometallic dye compound to be employed as an additive dye (stabilization dye) in this invention is selected to have an absorbency at a longer wavelength region as compared with that of cyanine dye employed as an optical recording medium, the energy excited by light is shifted from the cyanine dye to the stabilization dye. Further, if the metal of the organometallic dye compound is a transition metal such as copper or cobalt, the singlet oxygen excited by light would be quenched.

The mixing ratio of the organometallic dye compound to the aforementioned heat mode recording organic dye should preferably be 0.1–50 parts by weight to 100 parts by weight, more preferably 1–20 parts by weight to 100 parts by weight. Because if the mixing ratio of the organometallic dye compound is less than 0.1 part by weight, it is difficult to sufficiently inhibit the recording organic dye from being degraded due to the discoloration thereof by sunlight. On the other hand, if the mixing ratio of the organometallic dye compound is more than 50 parts by weight, the concentration of the recording organic dye becomes insufficient, so that it may result in undesirable phenomena, e.g. it may require a high reproducing power or the reflectance of the recording layer may become insufficient.

The optical information recording medium according to this invention can be manufactured as follows.

First of all, a recording organic dye such as a cyanine dye represented by the aforementioned general formula [1] is dissolved together with an organometallic dye compound mentioned above in a solvent to obtain a dye solution, which is then coated on a translucent substrate. The solvent to be employed in the preparation of this dye solution may be selected from chloroform, dichloroethane, a fluorine-based solvent such as fluorinated alcohol, methylethyl ketone, dimethylformamide, methanol, toluene, cyclohexanone, acetylacetone, diacetone alcohol, cellosolves such as methyl cellosolve, and dioxane. The mixing ratio of the cyanine dye in this case should preferably be 1 to 10% by weight.

As for the material for the substrate to be employed in this invention, glass, or plastics such as epoxy resin, methacryl resin, polycarbonate resin, polyester resin, polyvinyl chloride resin and polyolefin resin may be employed. The substrate may be provided in advance with tracking grooves or pits, which may be accompanied with a signal required for an address signal.

The coating of the aforementioned cyanine dye on a substrate should preferably be performed by means of a spin-coating method. The film thickness after being dried of the dye layer may be the same as that is conventionally adopted.

The stabilization dye according to this invention that is represented by the aforementioned general formula [30] may be used together with an auto-oxidation inhibitor, an ultraviolet ray absorber, a peroxide-cracking agent, a super oxide, a quencher, etc.

The optical information recording medium according to this invention may include a reflection layer in addition to the light interference layer. This reflection layer may be provided on its surface with a protective layer. This protective layer may also be deposited on the exposed surface (the surface through which a laser beam is irradiated) of the substrate.

As for the reflection layer, a film of high reflectivity, such as a metallic film may be employed. This metallic film can be formed by the vapor-deposition or sputtering of a metal such as Au, Al, Ag, Cu, Pt, an alloy comprising any of these metals or other kinds of metal, or an alloy containing other trace component. The protective layer is formed for the purpose of protecting the optical information recording medium or improving the weather resistance of the recording medium, and can be formed by coating a solution of a radiation cure type resin (such as an ultraviolet cure type resin) on a given surface by means of spin coating for instance and then curing the coated layer.

As a result, an optical disk comprising a substrate provided on its surface with a light interference layer, an reflection layer and any other optional layer such as a protective layer can be obtained. This optical disk comprising at least a light interference layer as an essential layer and any other optional layer(s) may be superimposed on another optical disk comprising at least a light interference layer as an essential layer and any other optional layer(s), or the substrate per se may be laminated on another substrate of an optical information recording medium.

As for the adhesives for forming this laminated structure, an ultraviolet-curing resin, a cationic-curing resin, a pressure sensitive adhesive double coated sheet may be employed. As for the method for forming this laminated structure, a hot-melt method, a spin-coating method, a dispense method (extrusion method), a screen printing method or a roll coating method may be employed.

DETAILED DESCRIPTION OF THE INVENTION

Figure 1:
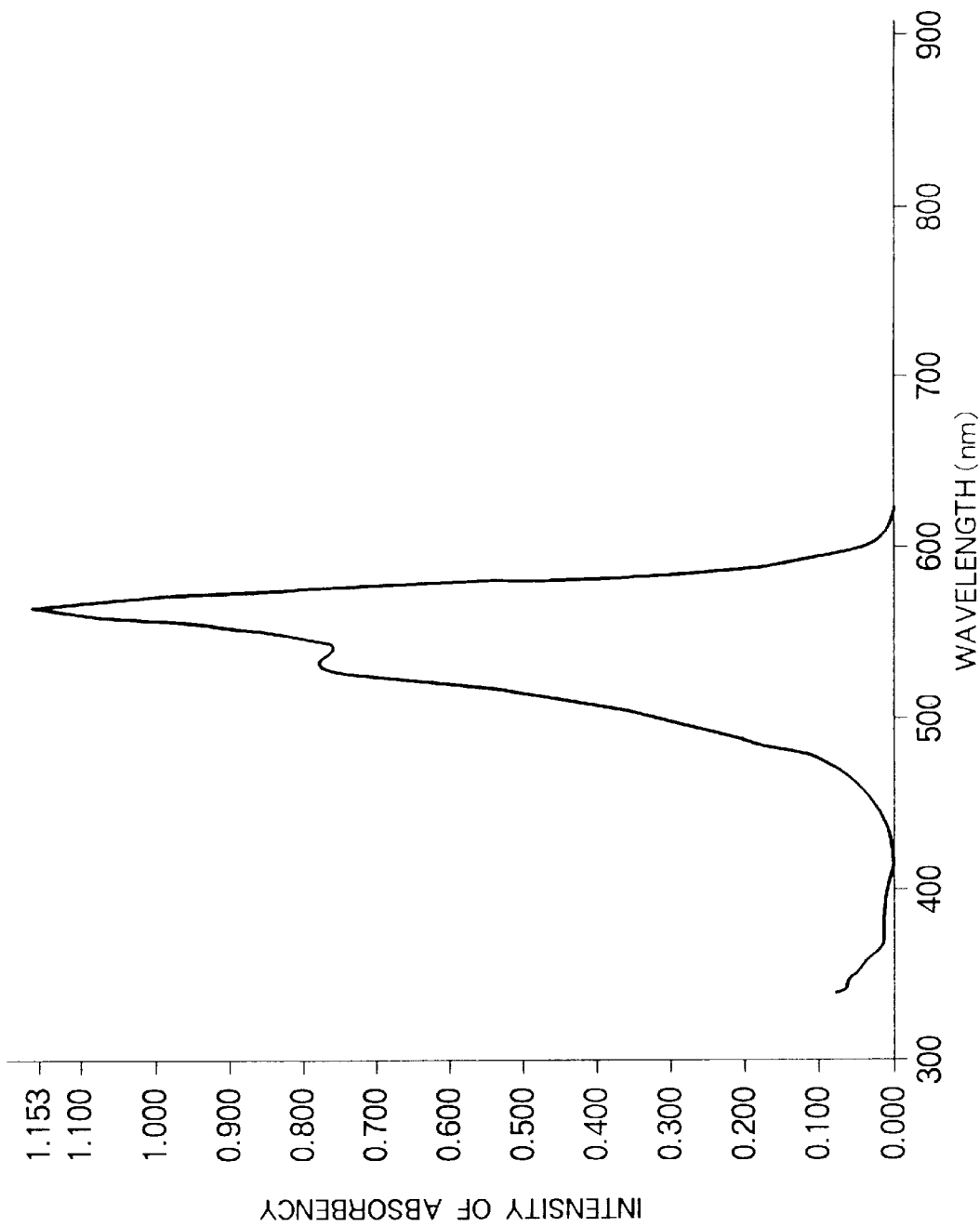
FIG. 1 is a graph showing the absorption spectrum of a cyanine dye employed in the first example of this invention.

This invention will be further explained in detail with reference to the following preferred embodiments.

In the following examples, a polycarbonate substrate was employed, and the dye layer of the light interference layer were selected as follows.

Namely, as Group I where B is 1 in the aforementioned general formula [1], (1) dyes represented by the aforementioned general formula [1] where the compounds of the general formulas [2] and [7] are combined, $D_1$ and $D_2$ are both hydrogen atom, and R and R' are the same or different from each other and are individually a lower alkyl group such as propyl or butyl; (2) dyes represented by the aforementioned general formula [1] where the compounds of the general formulas [2] and [6] are combined, D1 and D2 are both hydrogen atom, and R and R' are the same with each other and are individually a lower alkyl group such as ethyl; (3) dyes represented by the aforementioned general formula [1] where the compounds of the general formulas [2] and [6] are combined, D1 and D2 are both an alkyl having 6 to 10 carbon atoms; and (4) dyes represented by the aforementioned general formula [1] where the compounds of the general formulas [3] and [7] are combined, D1 and D2 are both hydrogen atom, and R and R' are the same with each other and are individually an alkyl having 1 to 7 carbon atoms are employed; and as Group II where B is 2 in the aforementioned general formula [1], (1) dyes represented by the aforementioned general formula [1] where the compounds of the general formulas [2] and [6] or the compounds of the general formulas [3] and [7] are combined; and among them, (2) dyes where D1 and D2 are both hydrogen atom, and R and R' may be the same or different from each other and are individually a lower alkyl group such as propyl or butyl were respectively employed. Further, among these Groups I and II, indolenine type cyanine dyes where $X^-$ is an anion such as $ClO_4^-$ (perchloric acid) or halogen were employed in plurality, selecting them from each dye or from each Group belonging to the dyes of (1) to (4) of the Group I or to the dyes of (1) and (2) of the aforementioned Group II.

As for the organometallic dye compounds to be co-used with these indolene type cyanine dyes, the following compounds represented by I to IV can be employed: i.e. I: the compounds represented by the aforementioned general formula [10] that can be derived from the combinations of (1) $M^1$ is Cu; (2) $n_1$ is 1 or 2; (3) $R^1$s are both ethyl group; (4) $R^2$ is methyl group; and (5) $Y^1$ is $ClO_4^-$; II: the compounds represented by the aforementioned general formula [11] that can be derived from the combinations of (1) $M^2$ is Cu; (2) $n_2$ is 2; (3) $R^3$s are both ethyl group; (4) $R^4$s are both ethyl group; and (5) $Y^2$ is $ClO_4^-$; III: the co-use of any one of the compounds represented by the aforementioned I and II with the compounds represented by the aforementioned general formula [12] that can be derived from the combinations of (1) $M^3$ is Ni; (2) $n_3$ is 2; (3) $R^5$s are both ethyl group; (4) $R^5$ is methyl group; and (5) $Y^3$ is $ClO_4^-$; IV: the compounds represented by the aforementioned general formula [31] that can be derived from the combinations of (1) $M^{02}$ is Co or Cu; (2) $R^{03}$s are both ethyl group; (3) $Y^{02}$ is $Cl^-$, $ClO_4^-$, $PF_6^-$, $BF_4^-$ or $NO_3^-$. These compounds may be obtained by sequentially adding the aforementioned limitations (1) to (5), or (1) to (3) to the products to be produced.

With respect to these cyanine dyes, one or plural of these specific dyes belonging to the aforementioned Group I or Group II are employed. With respect to these organometallic compounds, one or plural of these specific dyes belonging to each or plural of the aforementioned formulas are employed. Then, a solution of any of these combination between the cyanine dyes and the organometallic dye compounds is prepared and coated on the polycarbonate substrate to form a recording or light interference layer. Thereafter, a reflection layer consisting of Au or Al is deposited on the recording or light interference layer by means of sputtering. A protective layer comprising an ultraviolet-curing resin is further spin-coated on the reflection layer thereby obtaining a CD-R type optical disk. Alternatively, a pair of the polycarbonate substrates thus obtained are superimposed via an adhesive layer comprising an ultraviolet-curing resin which has been spin-coated on the polycarbonate substrate, thereby obtaining a laminate-type optical disk such as DVD-R.

When the cyanine dyes and the organometallic dye compounds are combined in this manner, it is possible to cause the absorption spectrum curve of the organometallic dye compounds to intersect with the absorption spectrum curve of cyanine dyes, and also to render the maximum absorption wavelength of the organometallic dye compounds to be existed on a longer wavelength side in relative to the maximum absorption wavelength of the cyanine dyes. As a result, part of optical energy to be absorbed by the cyanine dyes can be transferred to the organometallic dye compounds exhibiting the maximum absorption wavelength on the longer wavelength side as mentioned above, thereby inhibiting the discoloration or optical degradation of cyanine dye to the extent corresponding to the transfer of optical energy. Furthermore, since the maximum absorption wavelength of the organometallic dye compounds is existed on the longer wavelength side as mentioned above, the optical energy thus transferred is absorbed at this longer wavelength side, thus rendering an energy of low level (a reduced degree of optical energy) to be absorbed by the cyanine dyes without substantially affecting the light stability of the organometallic dye compounds. Further, the copper or cobalt existing in the organometallic dye compound functions to quench the singlet oxygen excited by light.

This invention will be further explained in detail with reference to the following examples.

EXAMPLE 1

Figure 2:
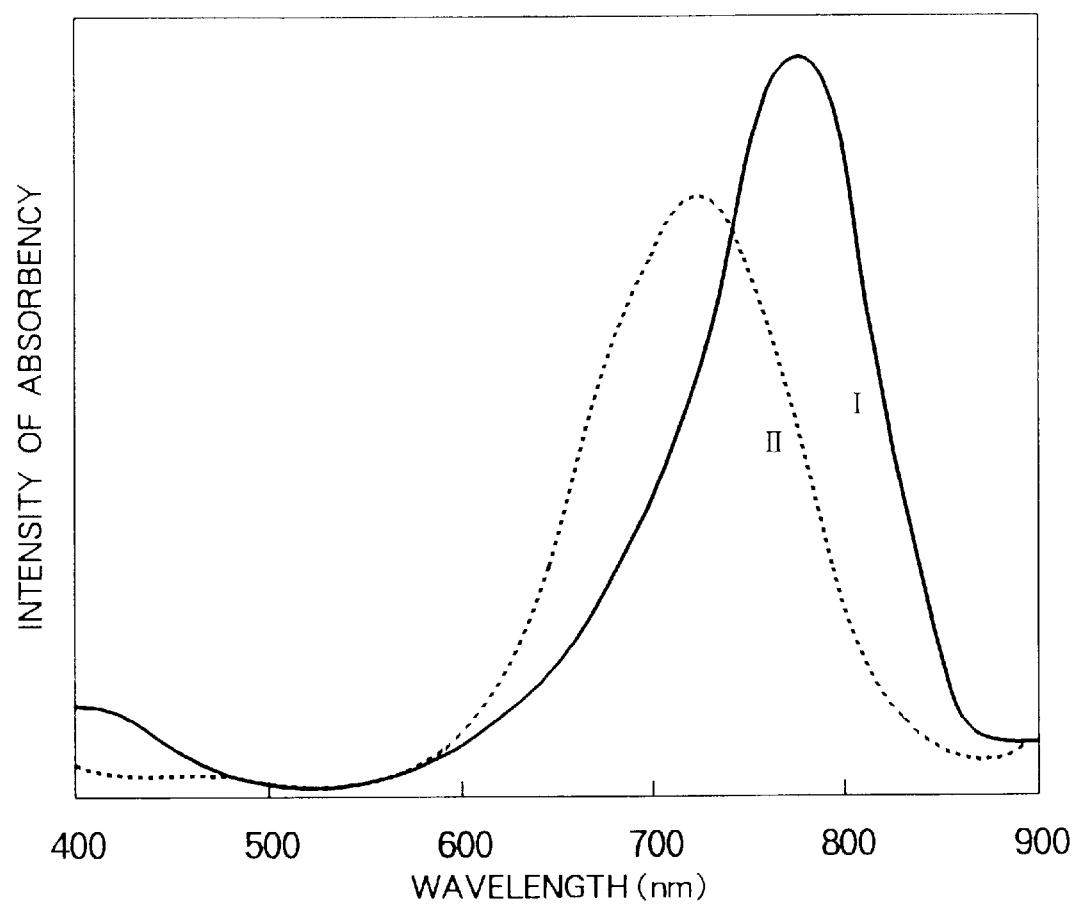
FIG. 2 is a graph showing the absorption spectrum of a naphthalenone derivative dye employed as an organometallic dye compound in the first example of this invention.

15 parts by weight of a trimethine-based cyanine dye exhibiting an absorption spectrum (in an acetone solution) as shown in FIG. 1 and a maximum absorption wavelength $\lambda_{max}$ of 568 nm, and represented by the following general formula [22] (NK-4321; Japanese Research Institute for Photosensitizing Dye Co., Ltd.), and 1.5 parts by weight of a di-perchloride of 8-aza-4-(4-diethylamino-2-methylphenyl-imino)-1(4H)-naphthalenone copper complex (1:1) exhibiting an absorption spectrum (in a 99% ethanol solution) as shown in FIG. 2 (II) and a maximum absorption wavelength $\lambda_{max}$ of 721 nm ($\epsilon$=60,000), and represented by the following general formula [23] were dissolved in one liter of tetrafluoropropanol to obtain a solution. This solution was then coated on a polycarbonate disk having a thickness of 0.6 mm and an outer diameter of 120 mm by means of a spin-coating method to form a light interference layer consisting of a photosensitive dye film having a film thickness of 40 nm.

By the way, the absorption spectrum (in a 99% ethanol solution) of a di-perchloride of 8-aza-4-(4-diethylamino-2-methylphenyl-imino)-1(4H)-naphthalenone copper complex (2:1) ($C_{40}H_{42}N_6O_{10}Cl_2Cu$ (molecular weight $M_w$: 900.5)) is shown in FIG. 2 (I) (a maximum absorption wavelength: 776 nm ($\epsilon$=144,000)).

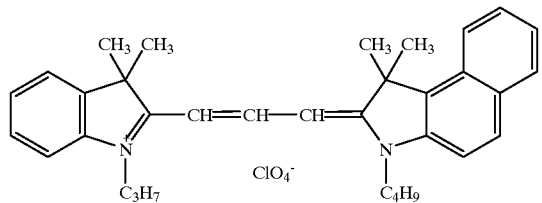

[22]

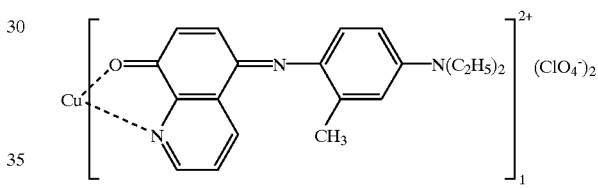

[23]

Then, the disk provided with this light interference layer was subjected to an exposure for 20 hours using a weathermeter (Atlas Electric Co., Ltd.), and then the absorption index at a maximum absorption wavelength $\lambda_{max}$ of 568 nm of the above trimethine-based cyanine dye after the exposure of the photosensitive dye film was measured. Thereafter, the percentage of this absorption index to the absorption index at a maximum absorption wavelength $\lambda_{max}$ of 568 nm of the trimethine-based cyanine dye which was measured before the exposure of the photosensitive dye film was calculated, the results being shown in Table 1 as the residual absorption ratio of dye.

After finishing this test, a reflection layer consisting of an Au film having a film thickness of 80 nm was formed, by means of sputtering method, on the surface of a portion (a region 44 mm to 117 mm in diameter) of the light interference layer deposited on the substrate.

Furthermore, an ultraviolet-curing resin (SD-211; Dainippon Ink & Chemicals Inc.) was spin-coated on the surface of the reflection layer, and then allowed to cure by irradiating ultraviolet rays to the coated layer to obtain a protective film having a film thickness of 5 μm.

Then, an ultraviolet-curing resin (SD-318; Dainippon Ink & Chemicals Inc.) was dripped on the protective film on the surface of this protective film and on a portion of the surface of the light interference layer which was not covered by the protective film. Thereafter, another substrate which was formed in the same manner as mentioned above was placed on the surface of the substrate carrying thereon the aforementioned ultraviolet-curing resin. After the resin interposed between these substrates was allowed to disperse by means of a spin-coating method, ultraviolet ray was irradiated, via said another substrate, to the ultraviolet-curing resin to cure it, thereby forming an adhesive layer 25 μm in thickness and 32 mm to 120 mm in diameter and adhering these superimposed substrates to obtain a laminate-type optical disk.

Then, a recording was performed on this optical disk by making use of a recording machine (DDU-1000; laser wavelength=635 nm; Pulsetech Industries Co., Ltd.) under a linear velocity of 3.5 m/sec., and the jitter ratio (%) was measured by making use of a time interval analyzer (TA-320; Yokogawa Electric Co., Ltd.). According to the specification of DVD Specification for Read-Only DISC, the Data to Clock Jitter (jitter) is a data which can be obtained by normalizing the deviation value a of the binarize-data-edge signal by taking the channel bit rate=26.6 Mbps (38.23 nsec.) as a standard clock. The evaluation of jitter is determined based on the EFM signal modulation of 3.5 m/sec. in linear velocity where the minimum pit length is set to 0.4 μm and the linear velocity is set to 3.5/sec. The value of jitter should be at most 8% or preferably 8% or less in view of preventing an accidental demodulation (decord) of the signal. The results of this measurement are shown in Table 1.

This Example illustrates one example of an optical disk for the DVD-R, where a mixture consisting of a cyanine dye which is asymmetrical in ring structures which are disposed on both sides of the trimethine chain and a naphthalenone derivative was employed. However, the residual absorption ratio of dye was high, and it was possible to perform the recording and the reproducing with a laser beam of 635 nm in wavelength. It will be seen that the jitter was not so high.

EXAMPLE 2

Figure 3:
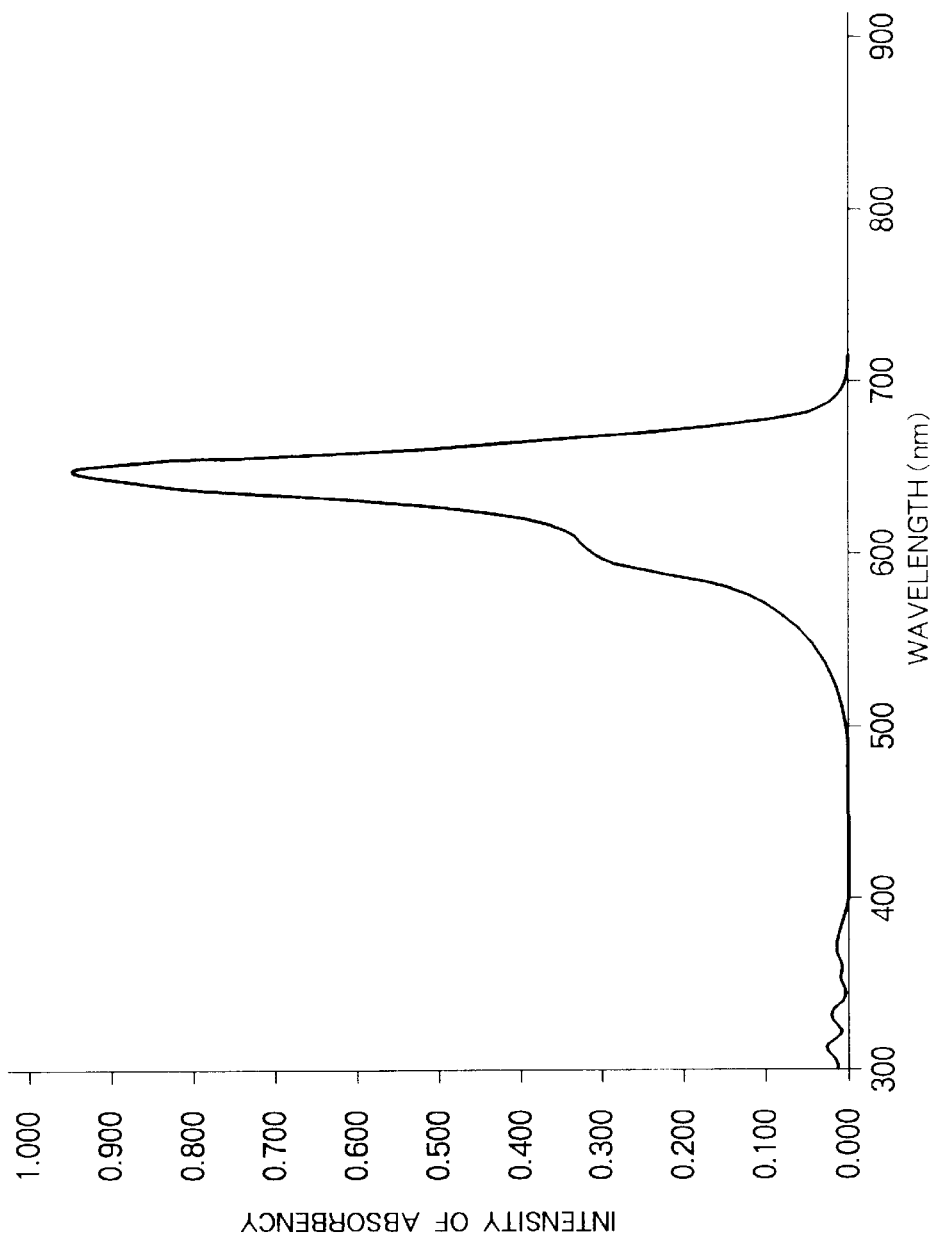
FIG. 3 is a graph showing the absorption spectrum of a cyanine dye employed in the second example of this invention.
Figure 4:
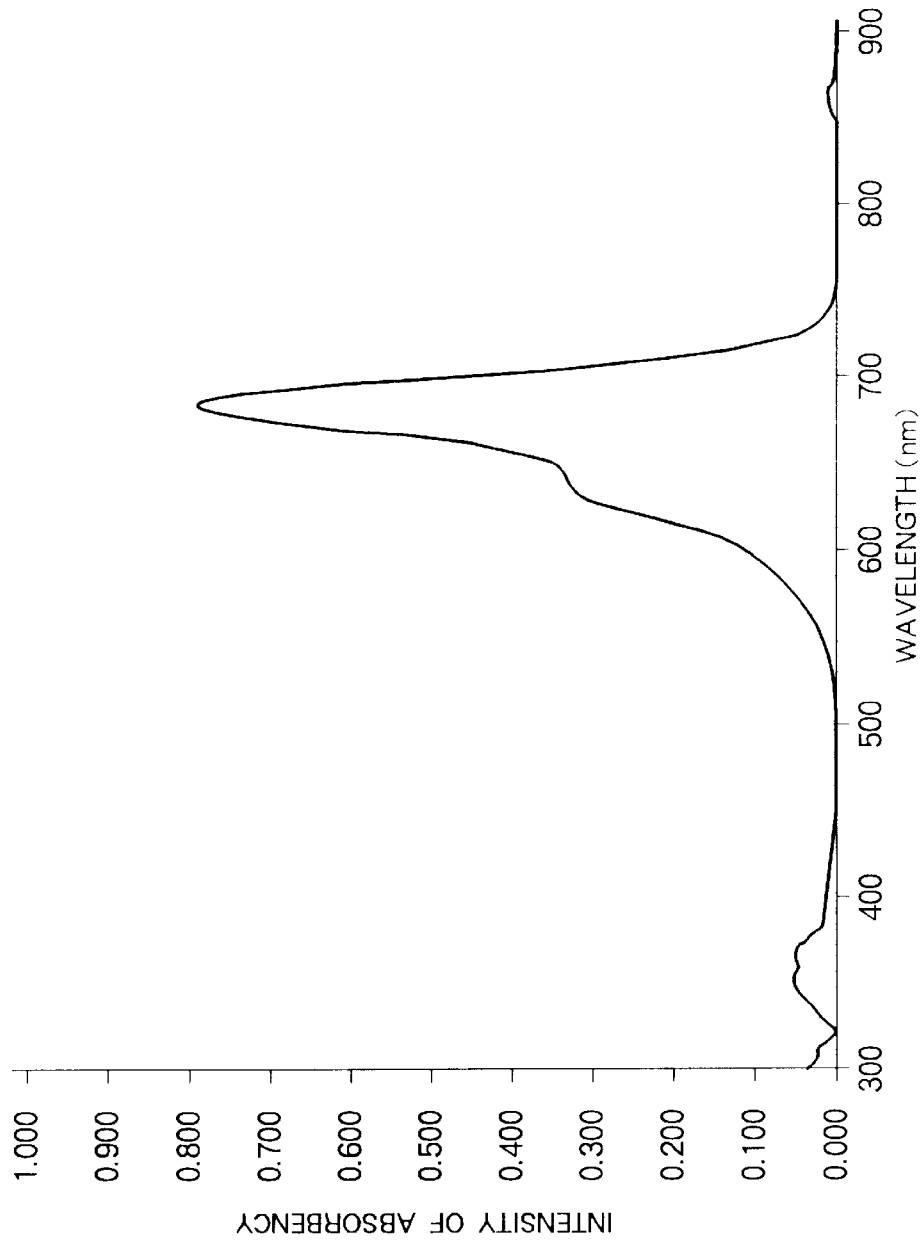
FIG. 4 is a graph showing the absorption spectrum of another cyanine dye employed in the second example of this invention.
Figure 5:
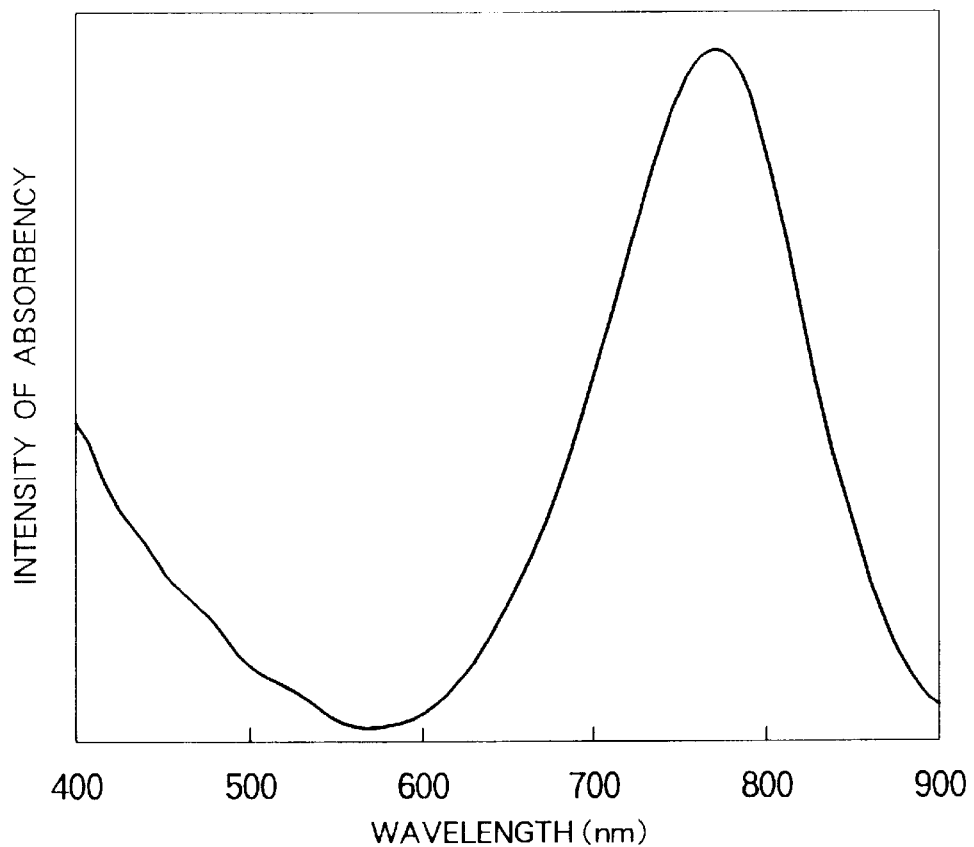
FIG. 5 is a graph showing the absorption spectrum of a naphthalenone derivative dye employed as an organometallic dye compound in the second example of this invention.

20 parts by weight of a pentamethine-based cyanine dye exhibiting an absorption spectrum (in an ethanol solution) as shown in FIG. 3 and a maximum absorption wavelength $\lambda_{max}$ of 651 nm, and represented by the following general formula [24] (NK-3345; Japanese Research Institute for Photosensitizing Dye Co., Ltd.), and 20 parts by weight of a pentamethine-based cyanine dye exhibiting an absorption spectrum (in an ethanol solution) as shown in FIG. 4 and a maximum absorption wavelength $\lambda_{max}$ of 684 nm, and represented by the following general formula [25] (NK-3251; Japanese Research Institute for Photosensitizing Dye Co., Ltd.) were dissolved in a mixed solvent consisting of 0.8 liter of methyl cellosolve and 0.2 liter of ethyl cellosolve to obtain a solution. Into this solution, there were further dissolved 1.5 parts by weight of a di-perchloride of 8-aza-4-(4-diethylamino-3-N,N-diethyl sulfoamidophenylimino)-1(4H)-naphthalenone copper complex (2:1) exhibiting an absorption spectrum (in a 99% ethanol solution) as shown in FIG. 5 and a maximum absorption wavelength $\lambda_{max}$ of 761 nm ($\epsilon$=30,800), and represented by the following general formula [26], and 0.5 parts by weight of a di-perchloride of 3-(4-diethylamino-2-methylphenylimino)-pyrido[2,3-a] phenothiazine nickel complex (2:1) ($C_{52}H_{48}N_8O_8Cl_2NiS_2$ (molecular weight: 1,105.9)) exhibiting an absorption spectrum (in an ethanol solution) as shown in FIG. 6(I) and a maximum absorption wavelength $\lambda_{max}$ of 838 nm ($\epsilon$=54, 400), and represented by the following general formula [27] to obtain a solution. This solution was then coated on a polycarbonate disk having a thickness of 1.2 mm and an outer diameter of 120 mm by means of a spin-coating method to form a light interference layer consisting of a photosensitive dye film having a film thickness of 65 nm.

Figure 6:
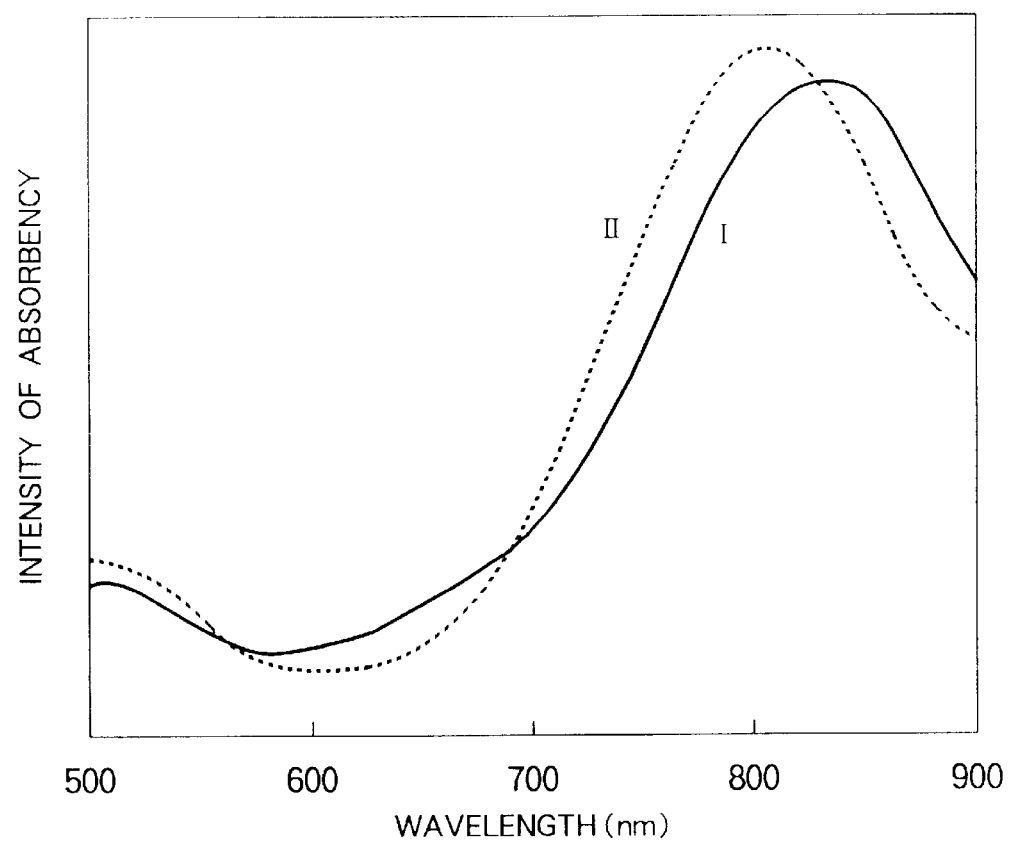
FIG. 6 is a graph showing the absorption spectrum of a pyridophenothiazine derivative dye employed as an organometallic dye compound in the second example of this invention.

By the way, the absorption spectrum (in an ethanol solution) of a di-perchloride of 3-(4-diethylamino-2-methylphenylimino)-pyrido[2,3-a] phenothiazine nickel complex (1:1) is shown in FIG. 6 (II) (a maximum absorption wavelength: 817 nm).

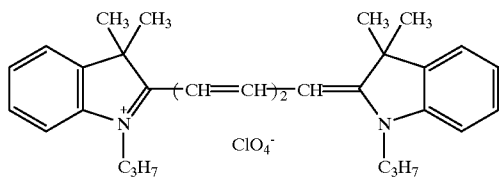

[24]

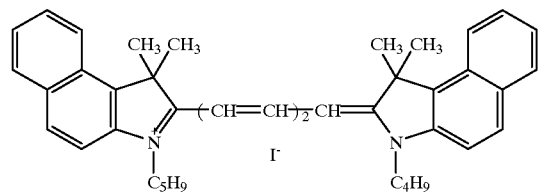

[25]

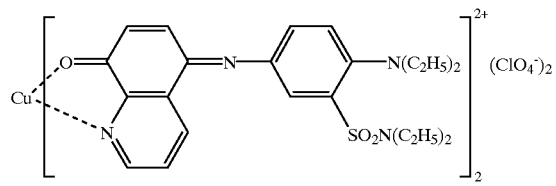

[26]

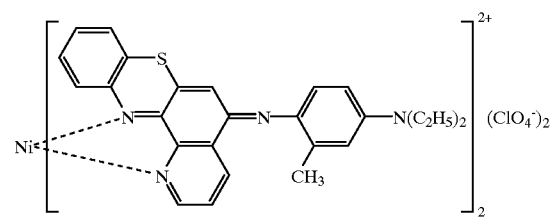

[27]

Then, the disk provided with this light interference layer was subjected to an exposure for 20 hours using a weathermeter (Atlas Electric Co., Ltd.), and then the absorption index at a maximum absorption wavelength $\lambda_{max}$ of 684 nm of the above pentamethine-based cyanine dye after the exposure of the photosensitive dye film was measured. Thereafter, the percentage of this absorption index to the absorption index at a maximum absorption wavelength $\lambda_{max}$ of 684 nm of the trimethine-based cyanine dye which was measured before the exposure of the photosensitive dye film was calculated, the results being shown in Table 1 as the residual absorption ratio of dye.

After finishing this test, a reflection layer and a protective film were successively formed in the same manner as in Example 1 thereby to manufacture an optical disk.

Then, a recording was performed on this optical disk by making use of a recording machine (DDU-1000; laser wavelength=784 nm; Pulsetech Industries Co., Ltd.) under a linear velocity of 1.2 m/sec., and the BLER (cps) was measured, the results being shown in Table 1.

This Example illustrates one example of an optical disk for the CD-R, where a mixture consisting of two kinds of pentamethine-based cyanine dye, a naphthalenone derivative and a pyridophenothiazine derivative were employed. It was found possible to perform the recording and the reproducing with a laser beam of 784 nm in wavelength. It will be seen that the error was minimal.

By the way, the aforementioned copper complex, nickel complex, the chemical formulas of them and FIGS. 2, 5 and 6 described herein are cited from "JOEM HANDBOOK 2, ABSORPTION SPECTRA OF DYES FOR DIODE LASERS by Masaru MATSUOKA" (BUNSHIN PUBLISHING Co., Ltd., Tokyo Japan, Aug. 25, 1990).

COMPARATIVE EXAMPLE 1

An optical disk provided with a light interference layer consisting of a photo-sensitive dye film was manufactured in the same manner as illustrated in Example 1 except that the di-perchloride of 8-aza-4-(4-diethylamino-2-methylphenyl-imino)-1(4H)-naphthalenone copper complex (1:1) was not employed. The measurements were performed on this disk in the same manner as illustrated in Example 1. The results of measurements obtained are shown in Table 1.

Likewise, a laminate-type optical disk was manufactured in the same manner as illustrated in Example 1 to measure the jitter, the results obtained being shown in Table 1.

This comparative example is related to one example of the DVD-R optical disk. However, since the organometallic dye compound was not employed, the residual absorption ratio of dye was low, and a deterioration in terms of jitter was recognized due to the discoloration of the cyanine dye.

COMPARATIVE EXAMPLE 2

An optical disk provided with a light interference layer consisting of a photo-sensitive dye film was manufactured in the same manner as illustrated in Example 2 except that the di-perchloride of 8-aza-4-(4-diethylamino-3-N,N-diethyl sulfoamidophenylimino)-1(4H)-naphthalenone copper complex (2:1) and the di-perchloride of 3-(4-diethylamino-2-methylphenylimino)-pyrido[2,3-a] phenothiazine nickel complex (2:1) were not employed. The measurements were performed on this disk in the same manner as illustrated in Example 1. The results of measurements obtained are shown in Table 1.

Likewise, an optical disk was manufactured in the same manner as illustrated in Example 2 to measure the BLER, the results obtained being shown in Table 1.

This comparative example is related to one example of the CD-R optical disk. However, since the organometallic dye compound was not employed, the residual absorption ratio of dye was low, and a lot of error was recognized due to the discoloration of the cyanine dye.

COMPARATIVE EXAMPLE 3

Figure 7:
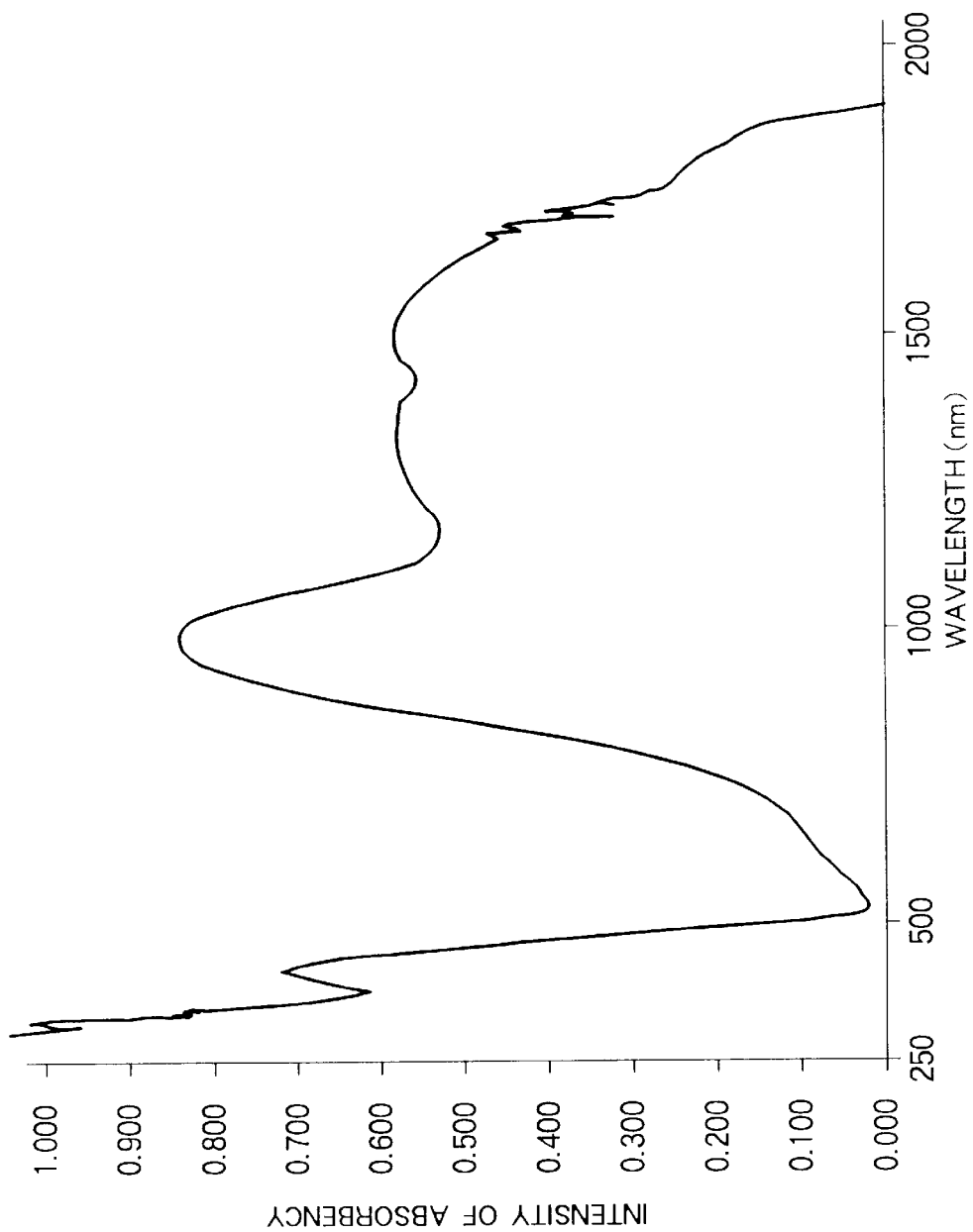
FIG. 7 is a graph showing the absorption spectrum of a singlet oxygen quencher employed in the third comparative example.

An optical disk provided with a light interference layer consisting of a photo-sensitive dye film was manufactured in the same manner as illustrated in Example 1 except that NIR-403 (Japan Carlit Co., Ltd.) exhibiting an absorption spectrum (in a dimethylformamide solution) as shown in FIG. 7 and a maximum absorption wavelength $\lambda_{max}$ of 986 nm, and represented by the following general formula [28] was substituted for the di-perchloride of 8-aza-4-(4-diethylamino-2-methylphenyl-imino)-1(4H)-naphthalenone copper complex (1:1). The measurements were performed on this disk in the same manner as illustrated in Example 1. The results of measurements obtained are shown in Table 1.

Likewise, a laminate-type optical disk was manufactured in the same manner as illustrated in Example 1 to measure the jitter, the results being shown in Table 1.

Although this comparative example is related to one example of the DVD-R optical disk, even if a singlet oxygen quencher was employed without employing an organometallic dye compound, the residual absorption ratio of dye was low, and a deterioration in terms of jitter as compared with that of Example 1 was recognized due to the discoloration of the cyanine dye.

[28]

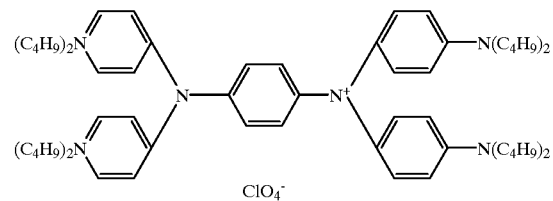

COMPARATIVE EXAMPLE 4

Figure 8:
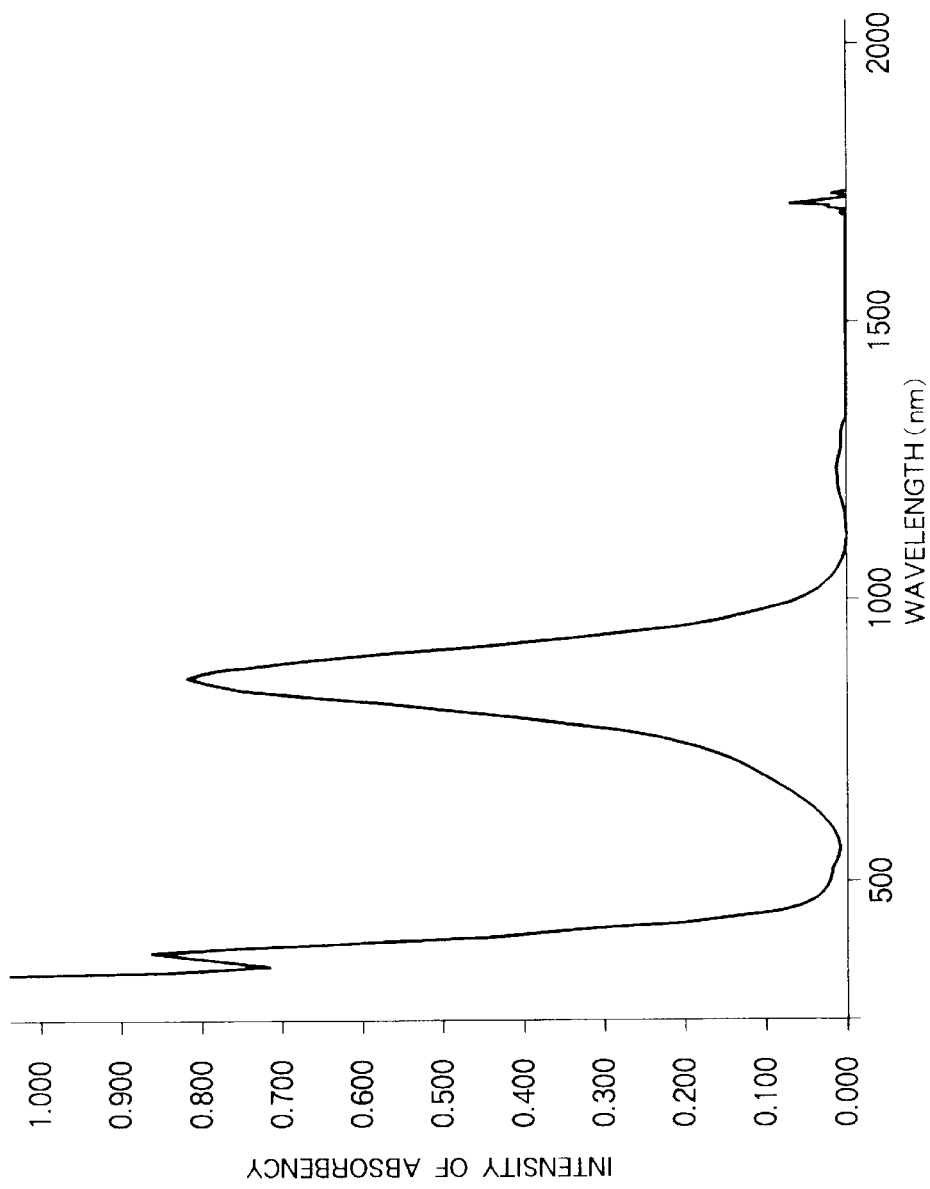
FIG. 8 is a graph showing the absorption spectrum of a singlet oxygen quencher employed in the fourth comparative example.

An optical disk provided with a light interference layer consisting of a photo-sensitive dye film was manufactured in the same manner as illustrated in Example 1 except that PA1006 (Mitsui Touatsu Co., Ltd.) exhibiting an absorption spectrum (in a dimethylformamide solution) as shown in FIG. 8 and a maximum absorption wavelength $\lambda_{max}$ of 872 nm, and represented by the following general formula [29] was substituted for the di-perchloride of 8-aza-4-(4-diethylamino-2-methylphenyl-imino)-1(4H)-naphthalenone copper complex (1:1). The measurements were performed on this disk in the same manner as illustrated in Example 1. The results of measurements obtained are shown in Table 1.

Likewise, a laminate-type optical disk was manufactured in the same manner as illustrated in Example 1 to measure the jitter, the results being shown in Table 1.

Although this comparative example is related to another example of the DVD-R optical disk, even if a singlet oxygen quencher was employed without employing an organometallic dye compound, the residual absorption ratio of dye was low, and a deterioration in terms of jitter as compared with that of Example 1 was recognized due to the discoloration of the cyanine dye.

[29]

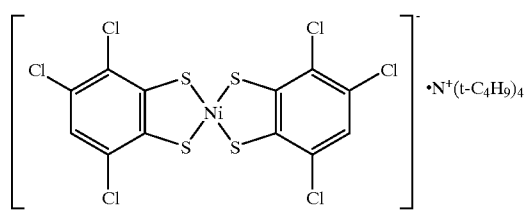

In view of these results and the aforementioned description, this invention (the cases where the compounds belonging to the aforementioned general formulas [10] and [11], or where the compounds represented by the general formula [12] are co-used with the compounds of the general formulas [10] and/or [11]) may be limited by the constituent features that "the residual absorption ratio of dye is not less than 90%, and jitter is less than 7 (more preferably not more than 5) or FLER is not more than 5", or by the constituent features that "the residual absorption ratio of dye is improved by not less than 9% as compared with where a singlet oxygen is employed, or improved by not less than 85% as compared with where a singlet oxygen is not employed, and jitter is less than 7 (more preferably not more than 5) or BLER is not more than 5" as measured under the aforementioned measuring conditions.

EXAMPLE 3

Figure 9:
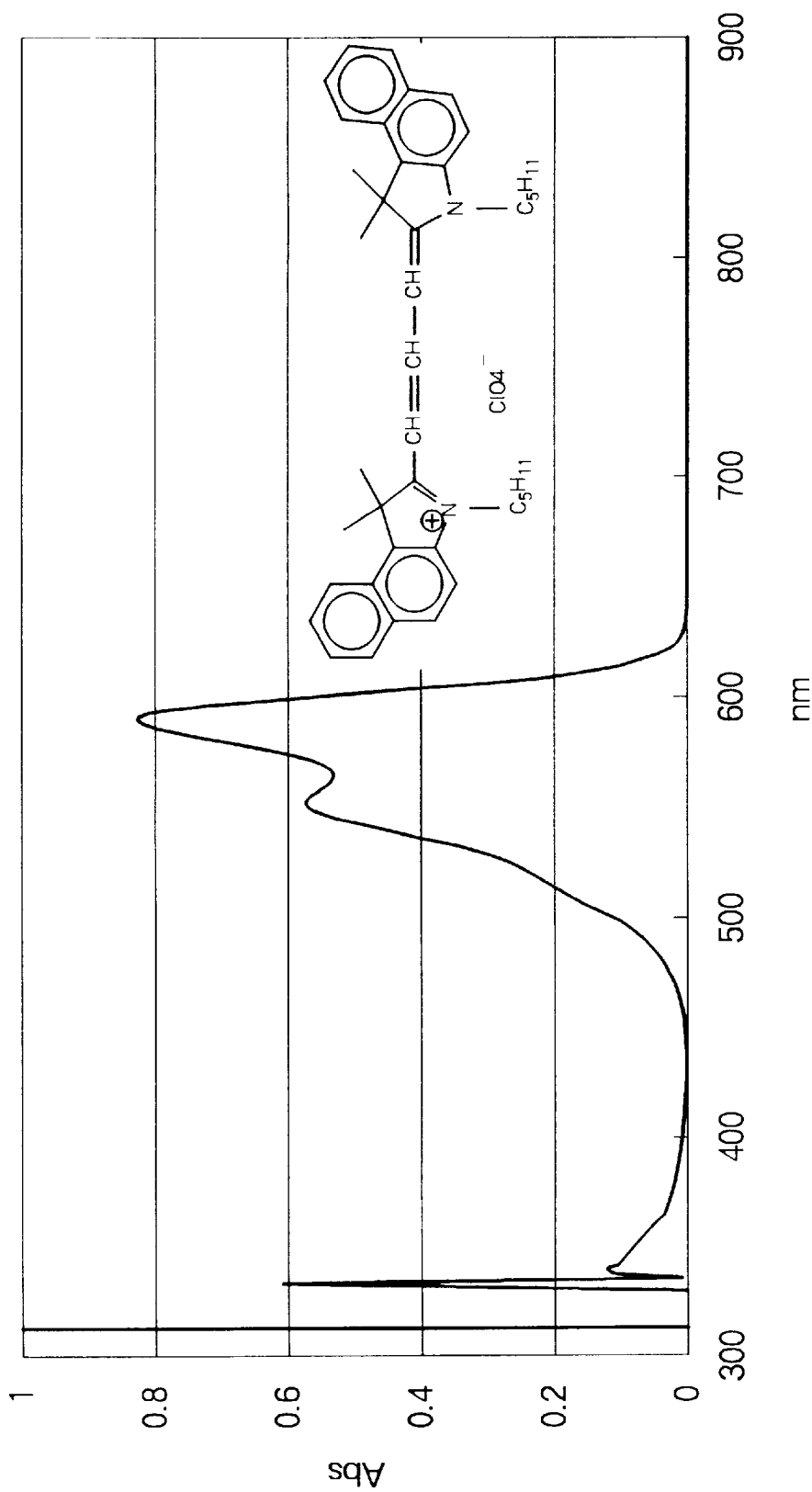
FIG. 9 is a graph showing the absorption spectrum of a cyanine dye employed in the third example of this invention.
Figure 10:
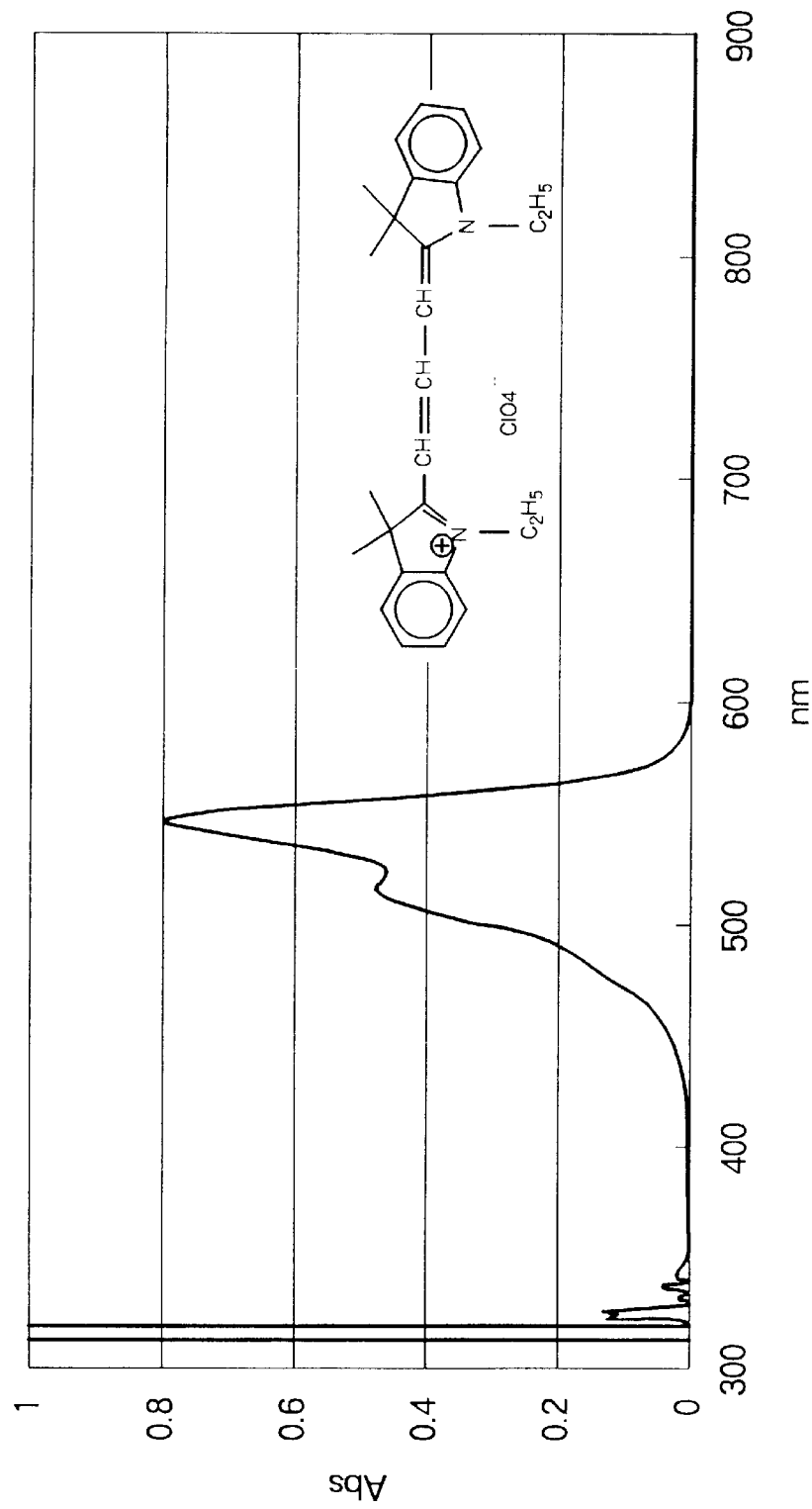
FIG. 10 is a graph showing the absorption spectrum of another cyanine dye employed in the third example of this invention.
Figure 11:
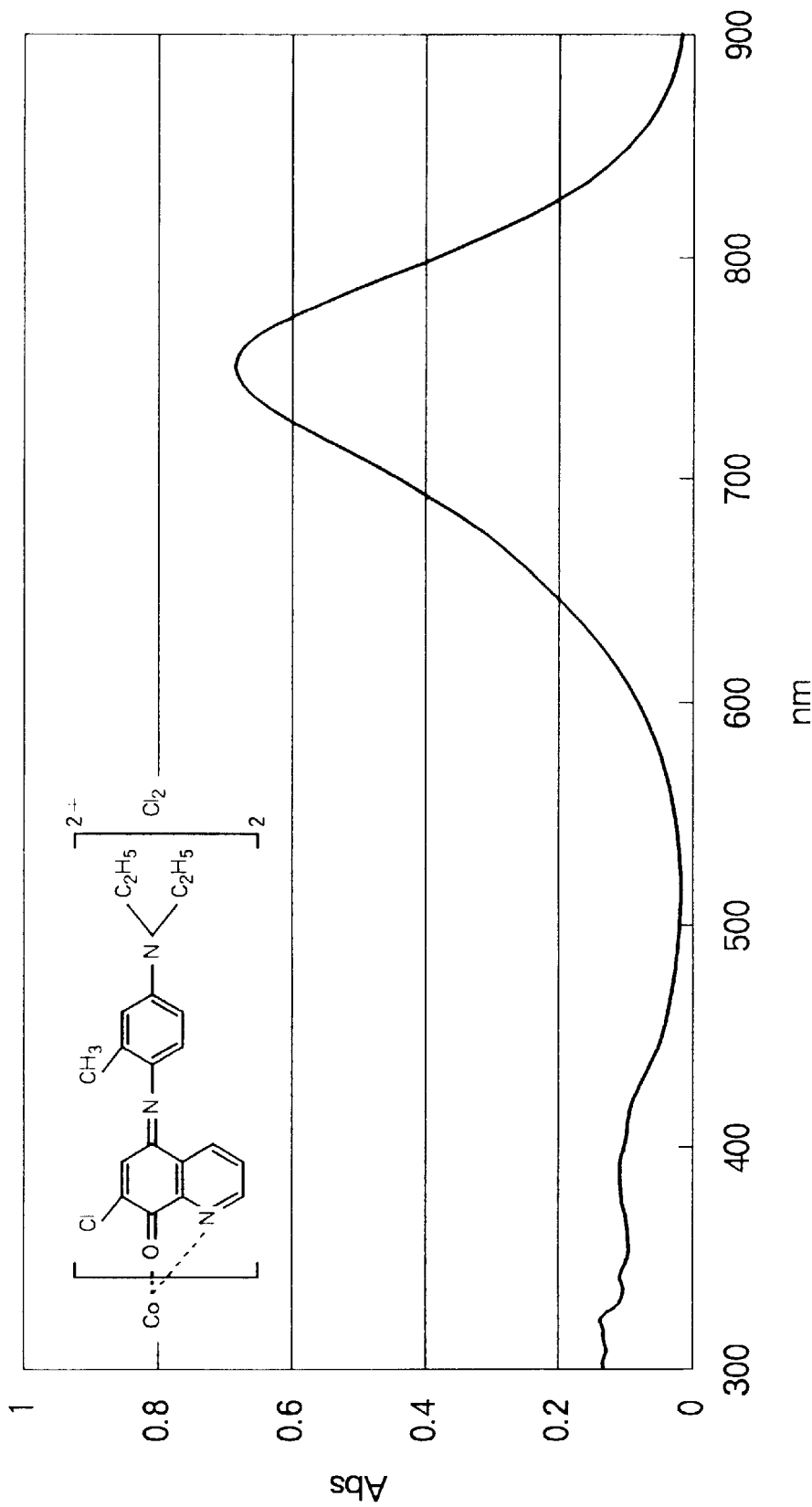
FIG. 11 is a graph showing the absorption spectrum of a naphthalenone derivative dye employed as an organometallic dye compound in the third example of this invention.

7.5 parts by weight of a trimethine-based cyanine dye exhibiting an absorption spectrum (in an acetone solution) as shown in FIG. 9 (the "Abs" of the ordinate denotes the intensity of absorbency; while "nm" of the abscissa denotes the unit of wavelength, the same in the following FIGS. described hereinafter) and a maximum absorption wavelength $\lambda_{max}$ of 588 nm, and represented by the following general formula [32] (NK-4285; Japanese Research Institute for Photosensitizing Dye Co., Ltd.), and 7.5 parts by weight of a trimethine-based cyanine dye exhibiting an absorption spectrum (in an acetone solution) as shown in FIG. 10 and a maximum absorption wavelength $\lambda_{max}$ of 546 nm, and represented by the following general formula [33] (NK-4270; Japanese Research Institute for Photosensitizing Dye Co., Ltd.) were dissolved in 1 liter of tetrafluoropropanol to obtain a solution. Into this solution, there was further dissolved 1.5 parts by weight of a naphthalenone derivative exhibiting an absorption spectrum (in an ethanol solution) as shown in FIG. 11 and a maximum absorption wavelength $\lambda_{max}$ of 752 nm, and represented by the following general formula [34] to obtain a solution. This solution was then coated on a polycarbonate disk having a thickness of 1.2 mm and an outer diameter of 120 mm by means of a spin-coating method to form a light interference layer consisting of a photosensitive dye film having a film thickness of 65 nm.

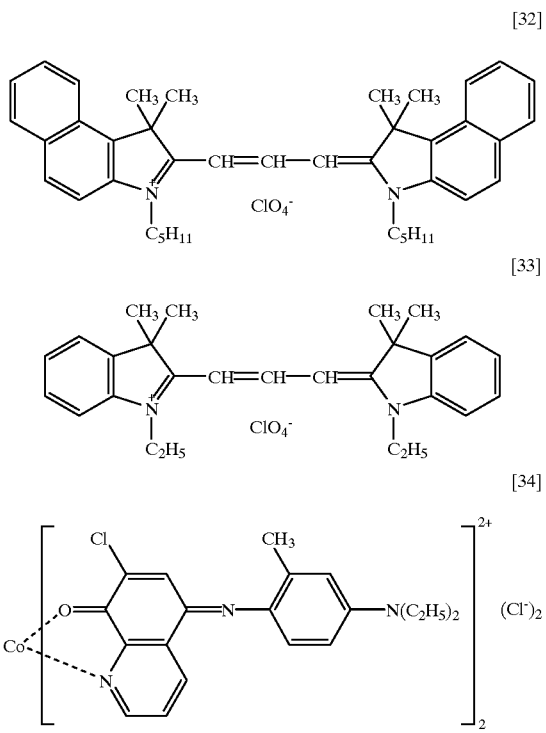

Then, the disk provided with this light interference layer was subjected to an exposure for 80 hours using a weathermeter (Atlas Electric Co., Ltd.), and then the absorption index at a maximum absorption wavelength $\lambda_{max}$ of 546 nm of the above pentamethine-based cyanine dye after the exposure of the photosensitive dye film was measured. Thereafter, the percentage of this absorption index to the absorption index at a maximum absorption wavelength $\lambda_{max}$ of 546 nm of the trimethine-based cyanine dye which was measured before the exposure of the photosensitive dye film was calculated, the results being shown in Table 2 as the residual absorption ratio of dye.

After finishing this test, a reflection layer and a protective film were successively formed in the same manner as in Example 1 thereby to manufacture an optical disk.

Then, the ratio of jitter (the ratio (%) of jitter after exposure) was measured on this optical disk in the same manner as shown in Example 1, the results being shown in Table 2. Likewise, a reflection layer and a protective film were successively formed on a disk provided with a light interference layer before the light exposure using the aforementioned weathermeter was performed thereby to manufacture an optical disk, which was then measured with respect to the ratio of jitter (the ratio (%) of jitter after exposure) in the same manner as mentioned above, the results being shown in Table 2.

This Example illustrates one example of an optical disk for the DVD-R, where a mixture consisting of two kinds of cyanine dyes each being symmetrical in ring structures which are disposed on both sides of the trimethine chain and a naphthalenone derivative belonging to the aforementioned general formula [31] was employed. However, the residual absorption ratio of dye was high, and it was possible to perform the recording and the reproducing with a laser beam of 635 nm in wavelength. It will be seen that the ratio of jitter was not so high.

EXAMPLE 4

Figure 12:
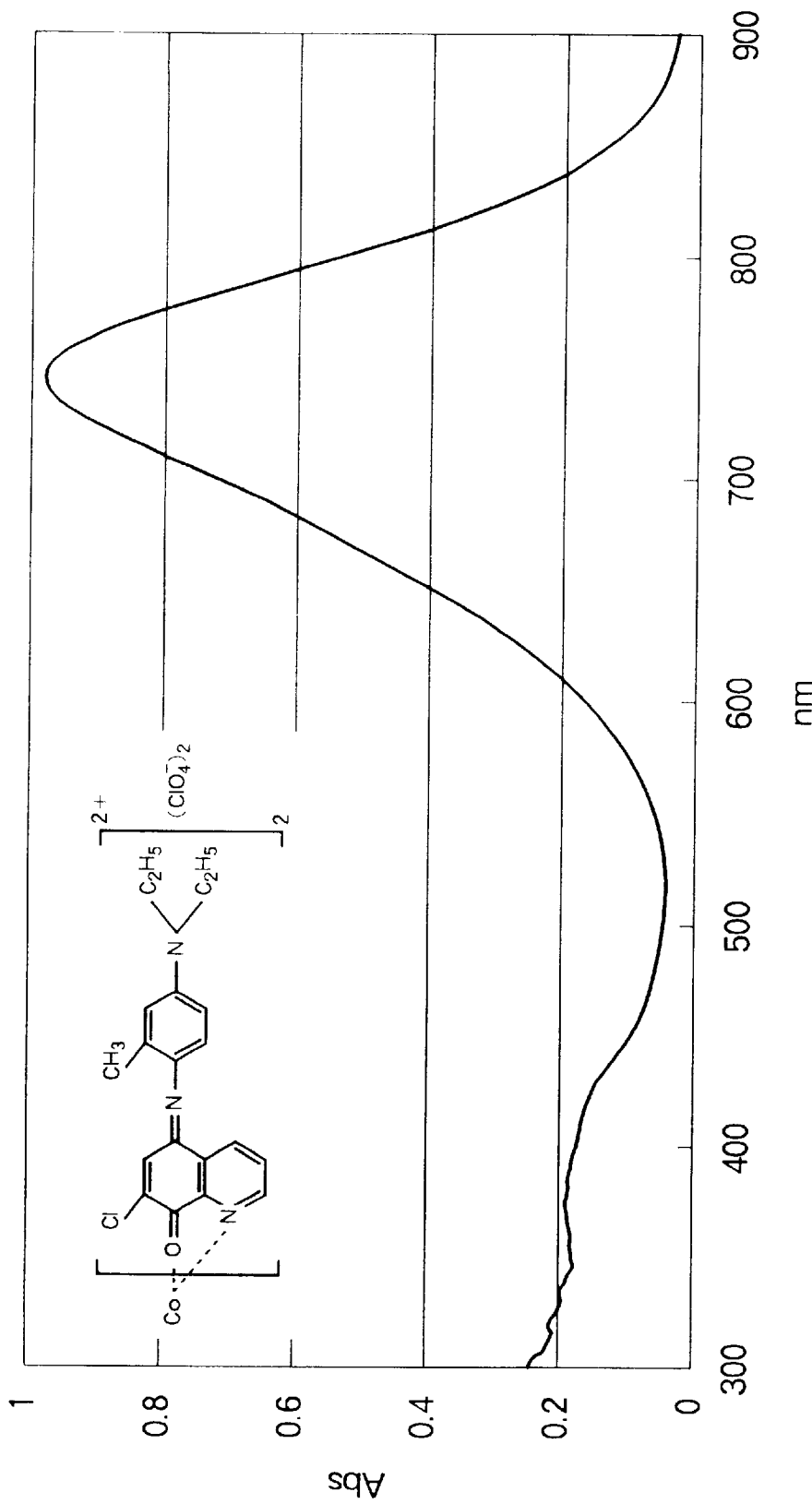
FIG. 12 is a graph showing the absorption spectrum of a naphthalenone derivative dye employed as an organometallic dye compound in the fourth example of this invention.

A disk provided with a light interference layer consisting of a photo-sensitive dye film as well as an optical disk were manufactured in the same manner as illustrated in Example 3 except that a naphthalenone derivative exhibiting an absorption spectrum (in an ethanol solution) as shown in FIG. 12 and a maximum absorption wavelength $\lambda_{max}$ of 746 nm, and represented by the following general formula [35] was substituted for the naphthalenone derivative exhibiting an absorption spectrum shown in FIG. 11. The measurements with respect to the residual absorption ratio of dye and to the ratio of jitter were performed on these disks. The results of measurements obtained are shown in Table 2.

Likewise, a laminate-type optical disk was manufactured in the same manner as illustrated in Example 1 to measure the jitter, the results being shown in Table 2.

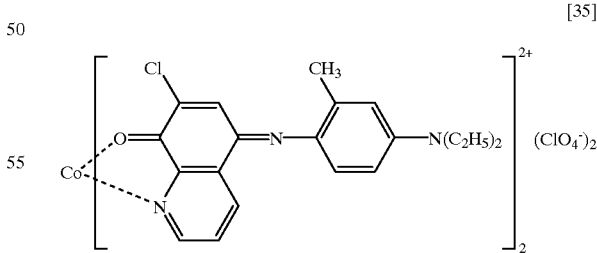

EXAMPLE 5

Figure 13:
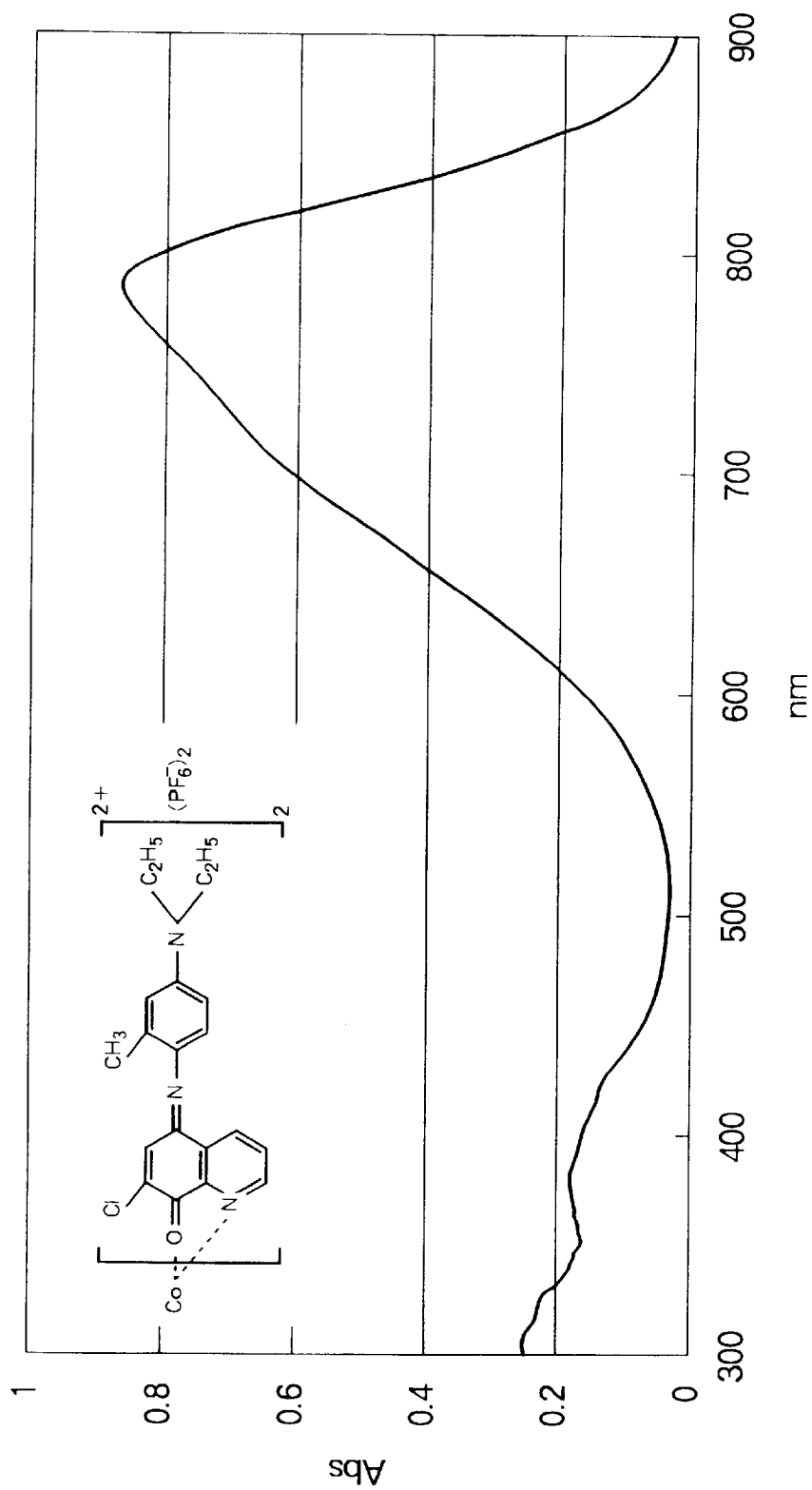
FIG. 13 is a graph showing the absorption spectrum of a naphthalenone derivative dye employed as an organometallic dye compound in the fifth example of this invention.

17 parts by weight of a mixed dye consisting of the trimethine-based cyanine dyes employed in Example 3, i.e. 80% by weight of the cyanine dye represented by the aforementioned general formula [32] (NK-4285; Japanese Research Institute for Photosensitizing Dye Co., Ltd.), and 20% by weight of the trimethine-based cyanine dye represented by the aforementioned general formula [33] (NK-4270; Japanese Research Institute for Photosensitizing Dye Co., Ltd.), and 1.0 part by weight of a naphthalenone derivative exhibiting an absorption spectrum (in an ethanol solution) as shown in FIG. 13 and a maximum absorption wavelength $\lambda_{max}$ of 786 nm, and represented by the following general formula [36] were dissolved in 1 liter of diacetone alcohol to obtain a solution. This solution was then coated on a polycarbonate disk having a thickness of 1.2 mm and an outer diameter of 120 mm by means of a spin-coating method to form a light interference layer consisting of a photosensitive dye film having a film thickness of 65 nm.

Then, in the same manner as described in Example 3, the residual absorption ratio of dye was calculated, and at the same time, an optical disk was manufactured to measure the ratio of jitter, the results being shown in Table 2.

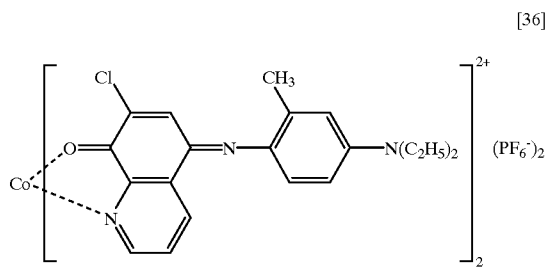

[36]

EXAMPLE 6

Figure 14:
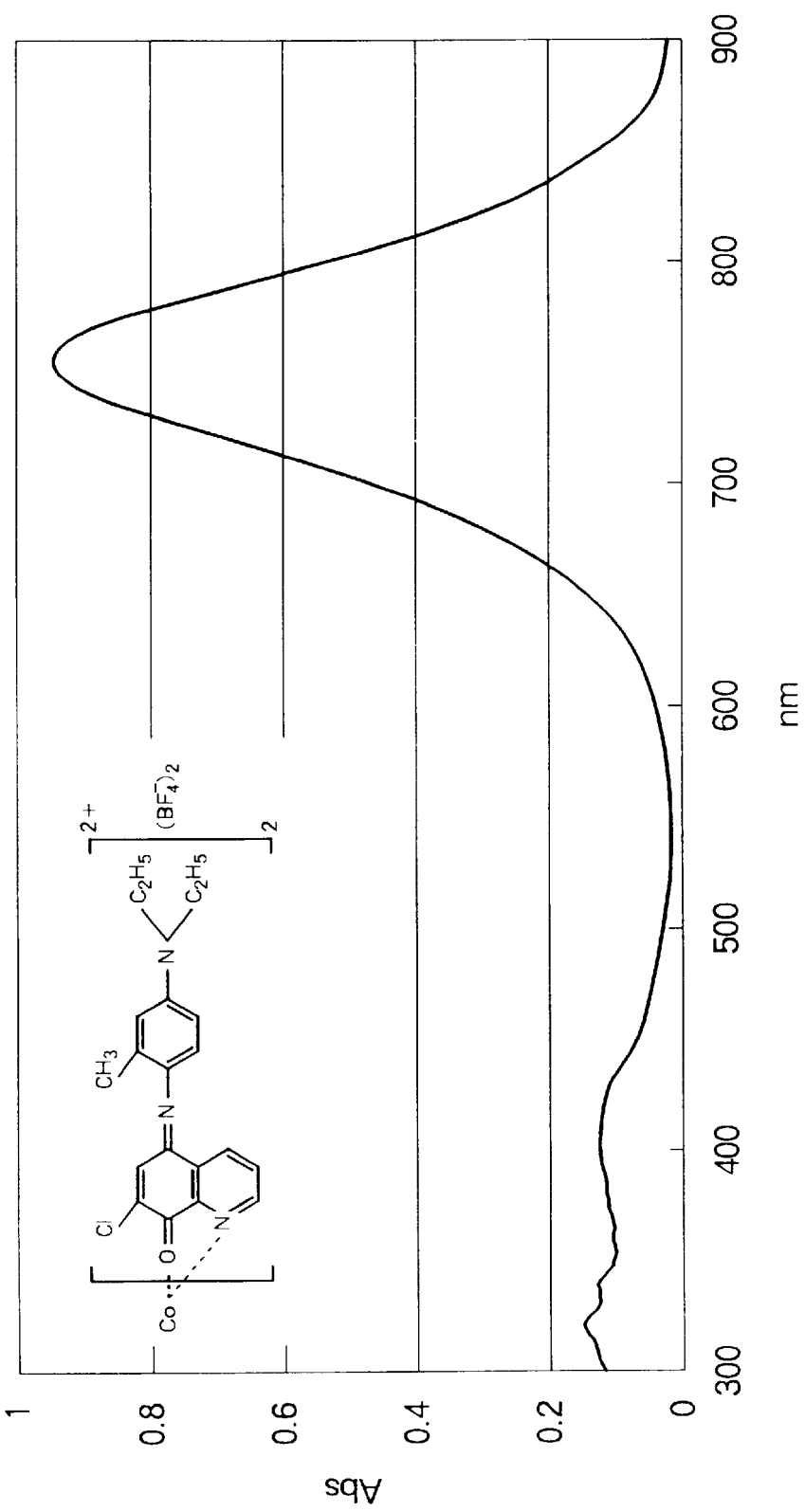
FIG. 14 is a graph showing the absorption spectrum of a naphthalenone derivative dye employed as an organometallic dye compound in the sixth example of this invention.

A disk provided with a light interference layer consisting of a photo-sensitive dye film as well as an optical disk were manufactured in the same manner as illustrated in Example 5 except that a naphthalenone derivative exhibiting an absorption spectrum (in an ethanol solution) as shown in FIG. 14 and a maximum absorption wavelength $\lambda_{max}$ of 752 nm, and represented by the following general formula [37] was substituted for the naphthalenone derivative exhibiting an absorption spectrum shown in FIG. 13. The measurements with respect to the residual absorption ratio of dye and to the ratio of jitter were performed on these disks. The results of measurements obtained are shown in Table 2.

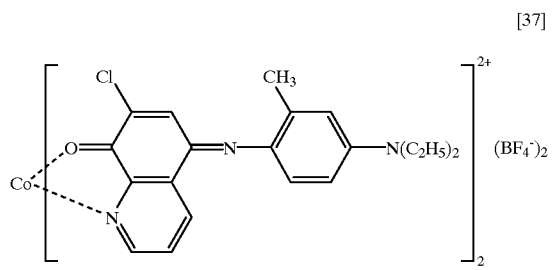

[37]

EXAMPLE 7

Figure 15:
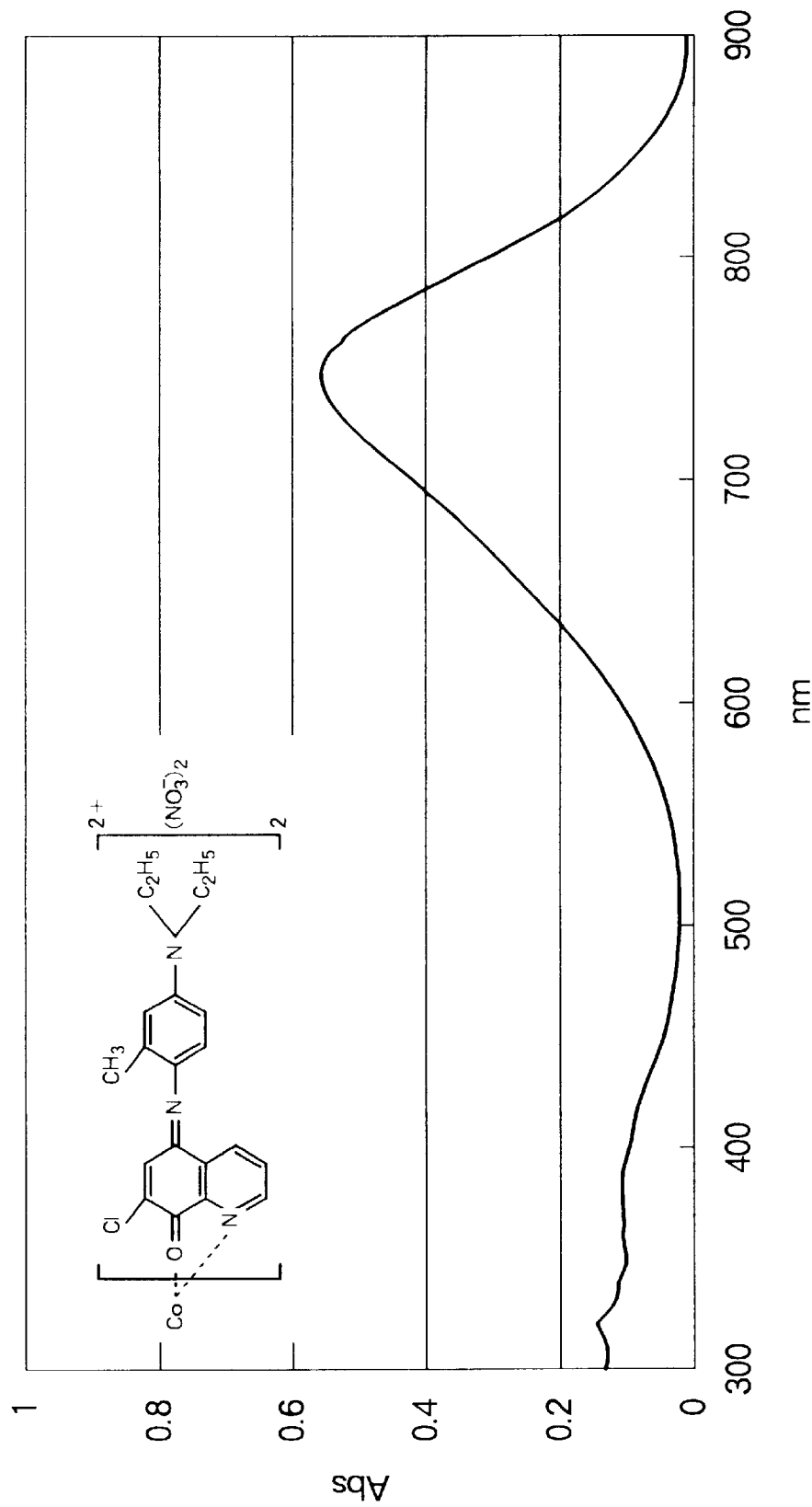
FIG. 15 is a graph showing the absorption spectrum of a naphthalenone derivative dye employed as an organometallic dye compound in the seventh example of this invention.

20 parts by weight of the trimethine-based cyanine dyes employed in Example 1 and represented by the aforementioned general formula [22] (NK-4321; Japanese Research Institute for Photosensitizing Dye Co., Ltd.), and 1.0 part by weight of a naphthalenone derivative exhibiting an absorption spectrum (in an ethanol solution) as shown in FIG. 15 and a maximum absorption wavelength $\lambda_{max}$ of 748 nm, and represented by the following general formula [38] were dissolved in 1 liter of diacetone alcohol to obtain a solution. This solution was then coated on a polycarbonate disk having a thickness of 1.2 mm and an outer diameter of 120 mm by means of a spin-coating method to form a light interference layer consisting of a photosensitive dye film having a film thickness of 65 nm.

Then, the residual absorption ratio of dye was calculated in the same manner as described in Example 3 except that the wavelength employed in the measurement was altered to $\lambda_{max}$=568 nm, and at the same time, an optical disk was manufactured to measure the ratio of jitter, the results being shown in Table 2.

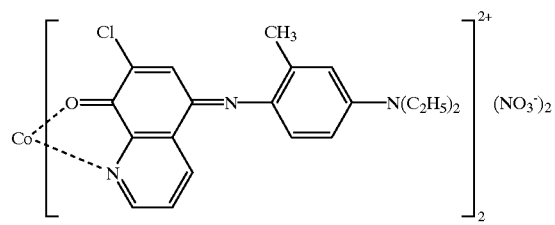

[38]

EXAMPLE 8

Figure 16:
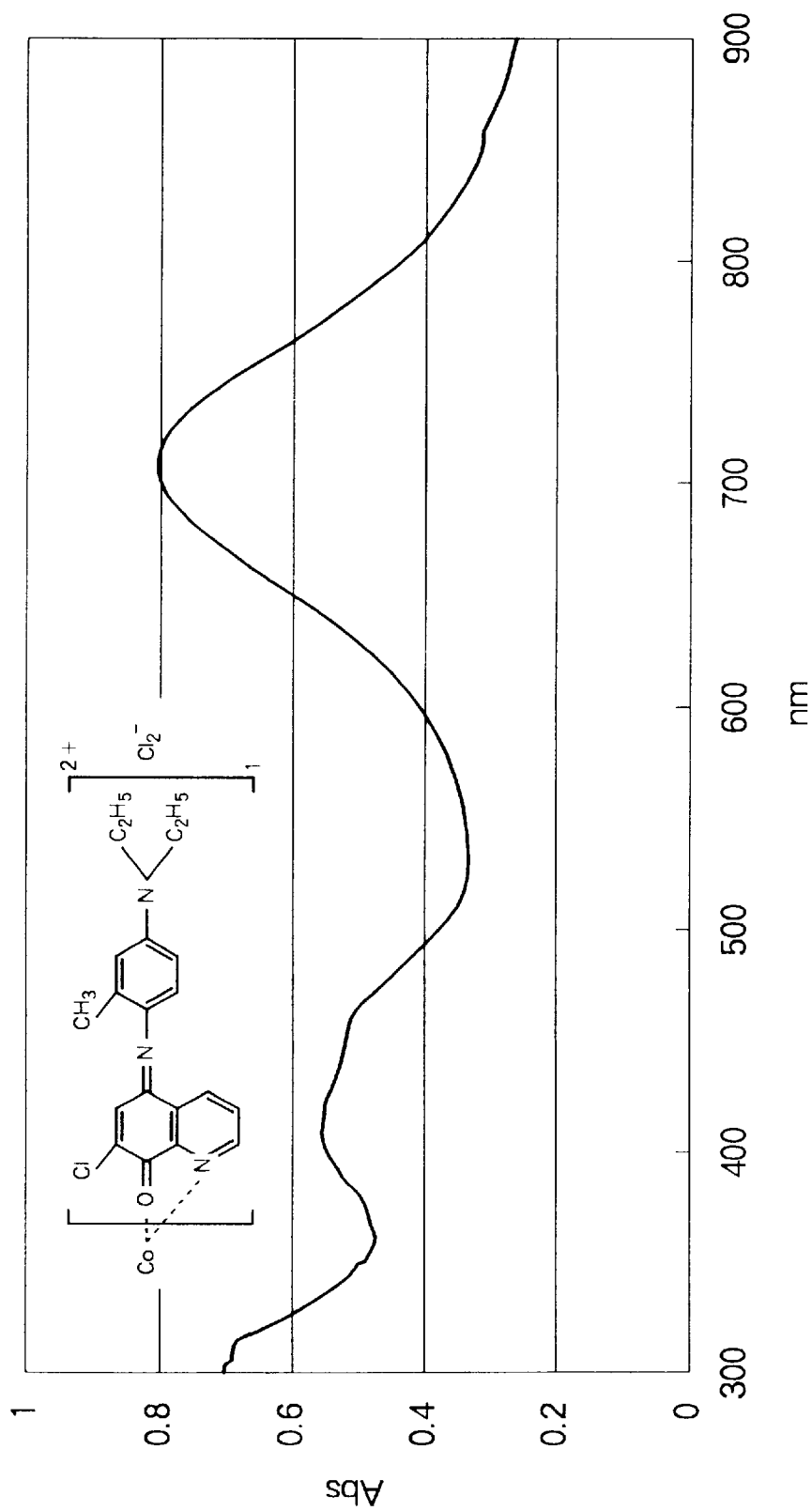
FIG. 16 is a graph showing the absorption spectrum of a naphthalenone derivative dye employed as an organometallic dye compound in the eighth example of this invention.

A disk provided with a light interference layer consisting of a photo-sensitive dye film as well as an optical disk were manufactured in the same manner as illustrated in Example 7 except that a naphthalenone derivative exhibiting an absorption spectrum (in an ethanol solution) as shown in FIG. 16 and a maximum absorption wavelength $\lambda_{max}$ of 706 nm, and represented by the following general formula [39] was substituted for the naphthalenone derivative exhibiting an absorption spectrum shown in FIG. 15. The measurements with respect to the residual absorption ratio of dye and to the ratio of jitter were performed on these disks. The results of measurements obtained are shown in Table 2.

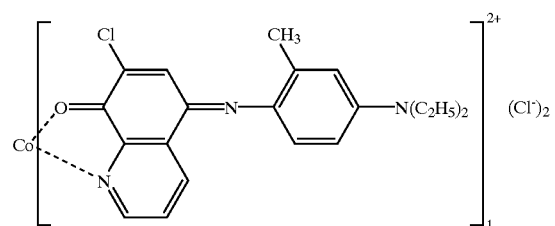

[39]

EXAMPLE 9

Figure 17:
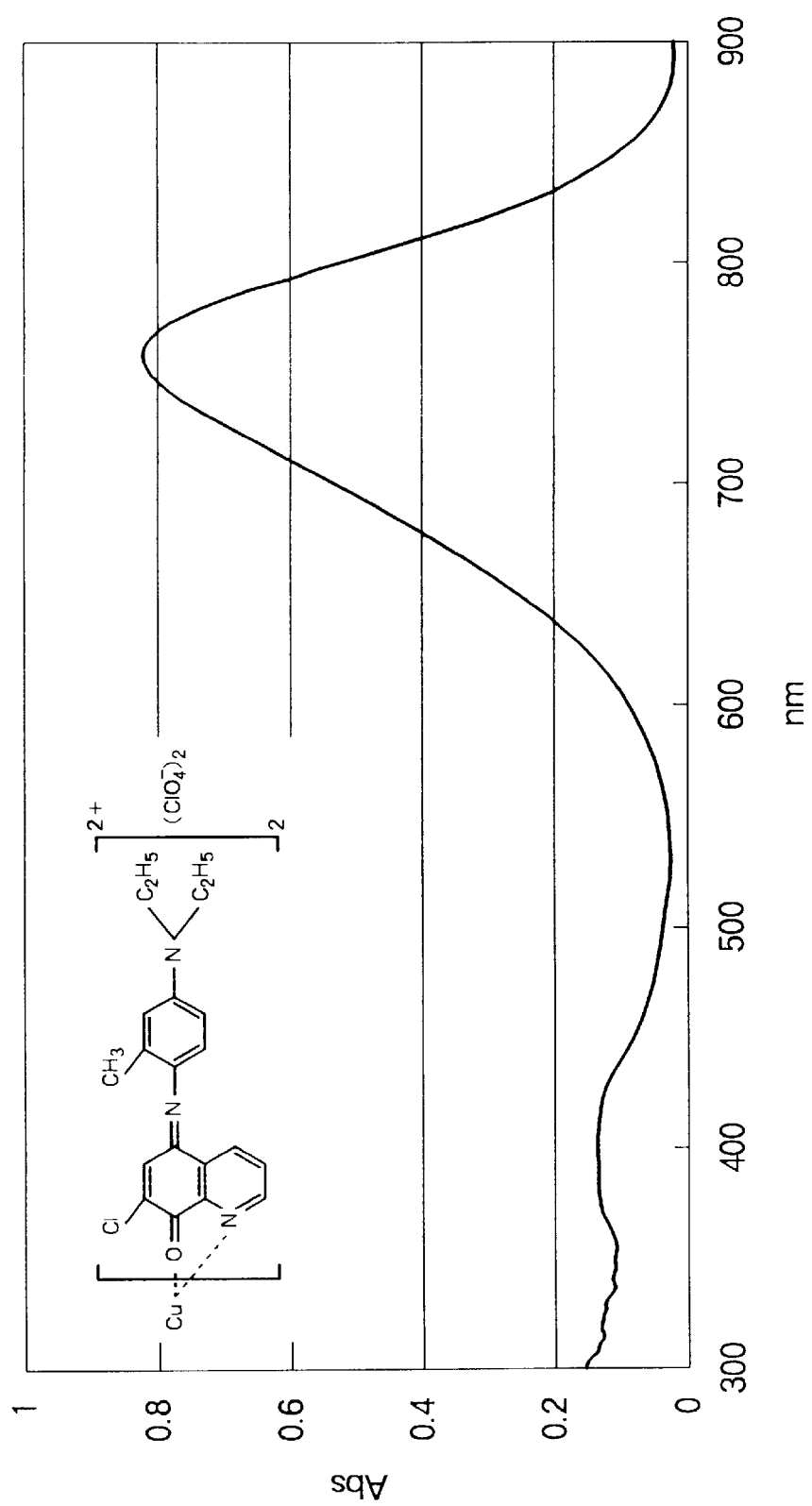
FIG. 17 is a graph showing the absorption spectrum of a naphthalenone derivative dye employed as an organometallic dye compound in the ninth example of this invention.

A disk provided with a light interference layer consisting of a photo-sensitive dye film as well as an optical disk were manufactured in the same manner as illustrated in Example 7 except that a naphthalenone derivative exhibiting an absorption spectrum (in an ethanol solution) as shown in FIG. 17 and a maximum absorption wavelength $\lambda_{max}$ of 758 nm, and represented by the following general formula [40] was substituted for the naphthalenone derivative exhibiting an absorption spectrum shown in FIG. 15. The measurements with respect to the residual absorption ratio of dye and to the ratio of jitter were performed on these disks. The results of measurements obtained are shown in Table 2.

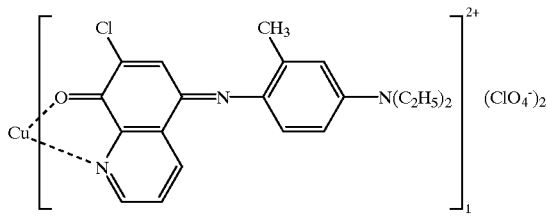

[40]

EXAMPLE 10

Figure 18:
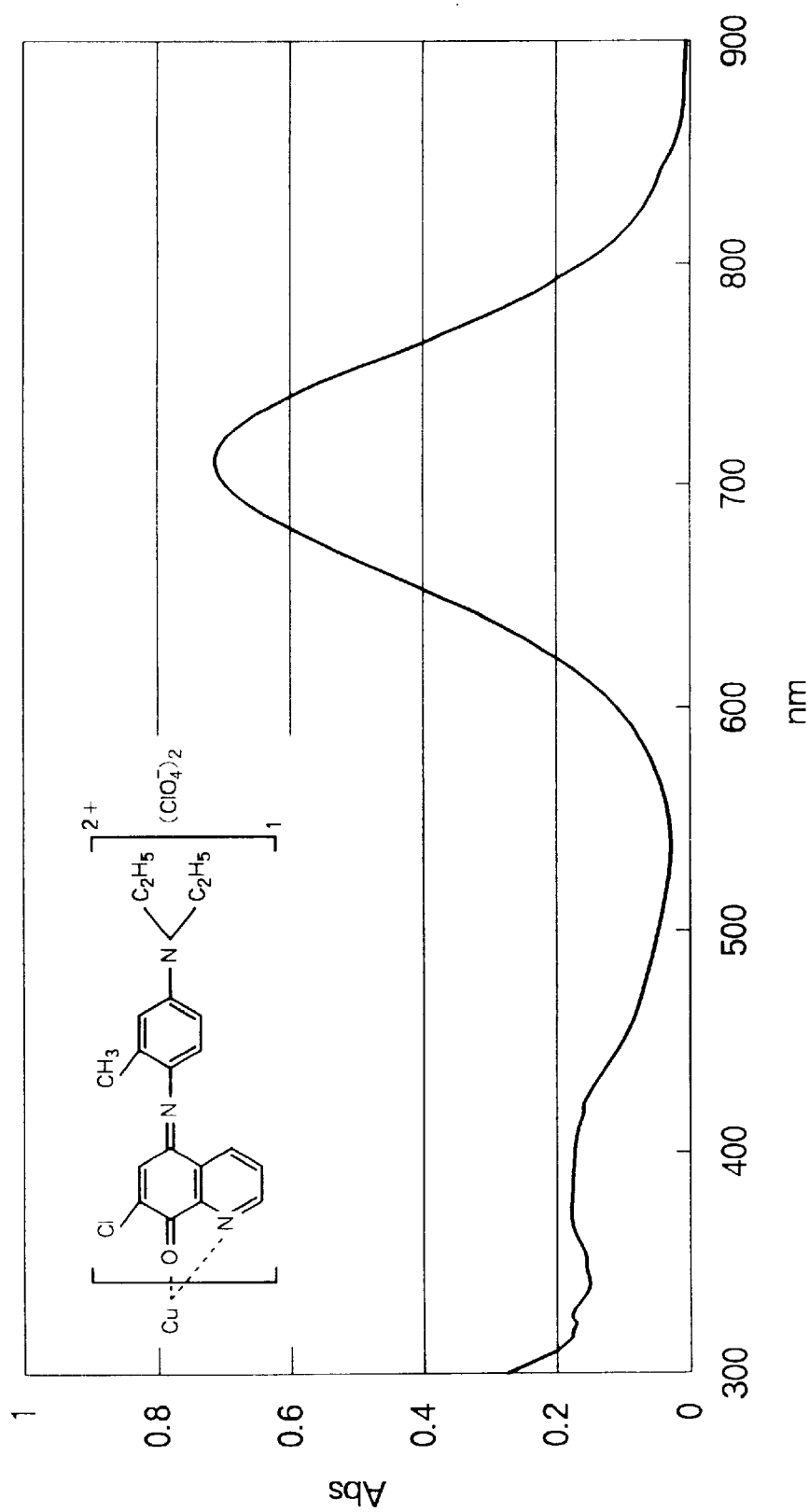
FIG. 18 is a graph showing the absorption spectrum of a naphthalenone derivative dye employed as an organometallic dye compound in the tenth example of this invention.

A disk provided with a light interference layer consisting of a photo-sensitive dye film as well as an optical disk were manufactured in the same manner as illustrated in Example 7 except that a naphthalenone derivative exhibiting an absorption spectrum (in an ethanol solution) as shown in FIG. 18 and a maximum absorption wavelength $\lambda_{max}$ of 710 nm, and represented by the following general formula [41] was substituted for the naphthalenone derivative exhibiting an absorption spectrum shown in FIG. 15. The measurements with respect to the residual absorption ratio of dye and to the ratio of jitter were performed on these disks. The results of measurements obtained are shown in Table 2.

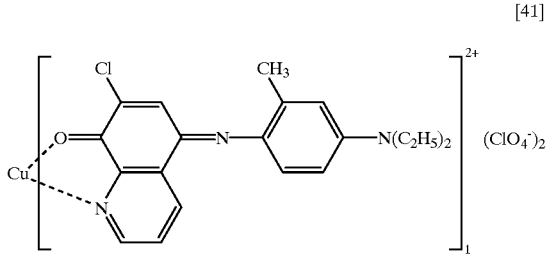

[41]

EXAMPLE 11

Figure 19:
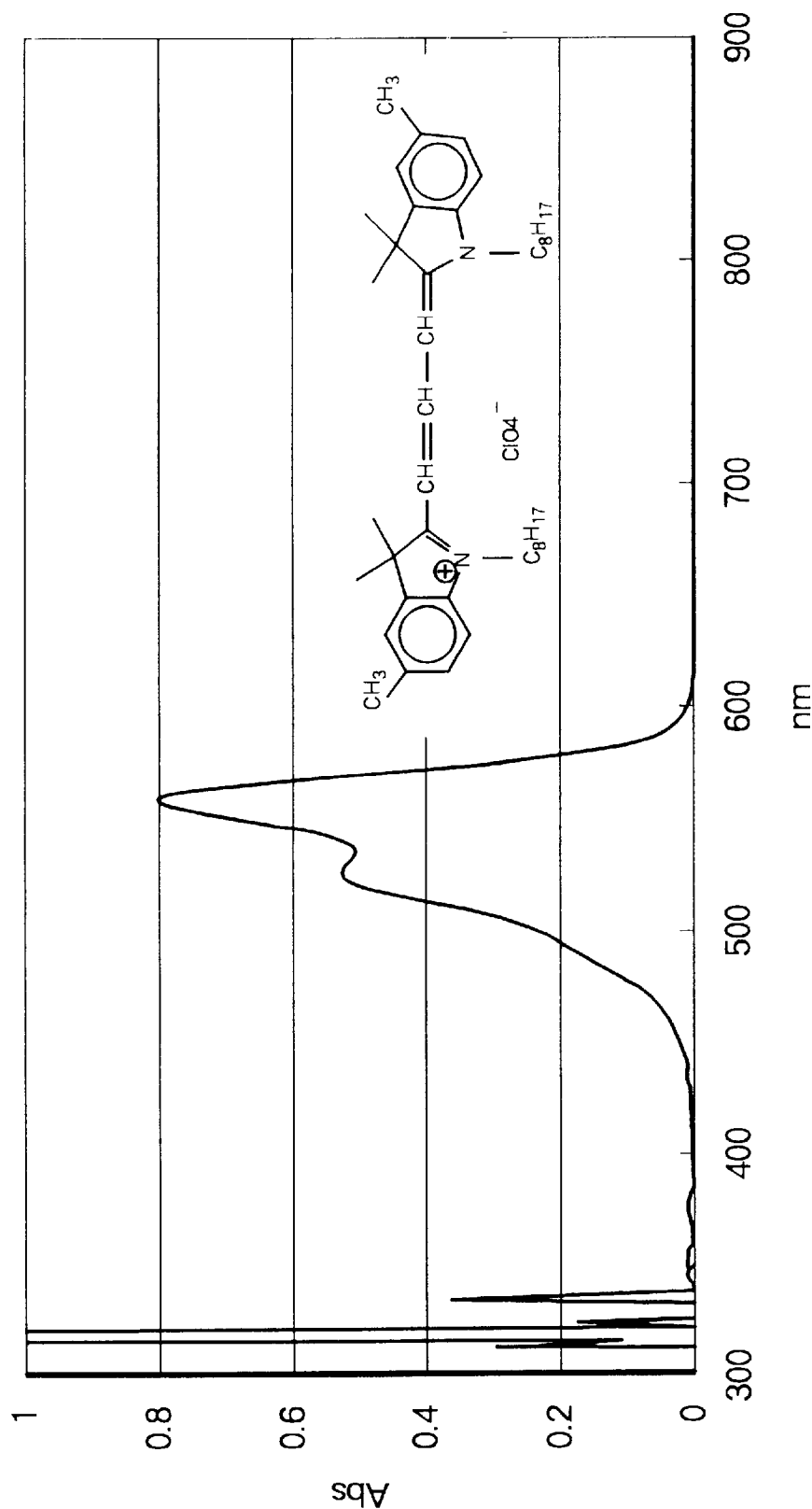
FIG. 19 is a graph showing the absorption spectrum of a cyanine dye employed in the eleventh example of this invention.
Figure 20:
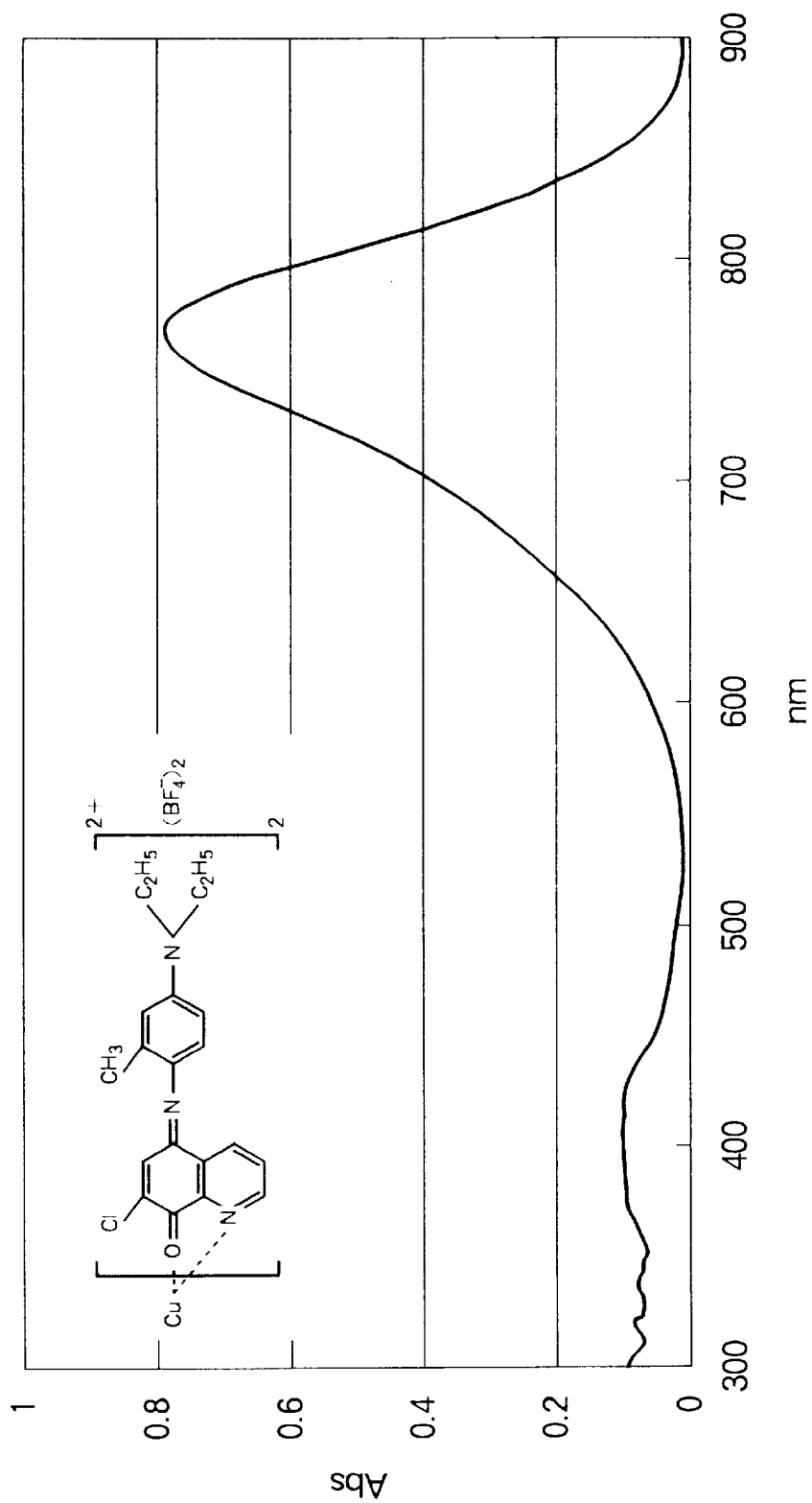
FIG. 20 is a graph showing the absorption spectrum of a naphthalenone derivative dye employed as an organometallic dye compound in the eleventh example of this invention.

20 parts by weight of the trimethine-based cyanine dyes exhibiting an absorption spectrum (in an acetone solution) as shown in FIG. 19 and a maximum absorption wavelength $\lambda_{max}$ of 558 nm, and represented by the following general formula [42] and 2.0 parts by weight of a naphthalenone derivative exhibiting an absorption spectrum (in an ethanol solution) as shown in FIG. 20 and a maximum absorption wavelength $\lambda_{max}$ of 766 nm, and represented by the following general formula [43] were dissolved in 1 liter of tetrafluoropropanol to obtain a solution. This solution was then coated on a polycarbonate disk having a thickness of 1.2 mm and an outer diameter of 120 mm by means of a spin-coating method to form a light interference layer consisting of a photosensitive dye film having a film thickness of 65 nm.

Then, the residual absorption ratio of dye was calculated in the same manner as described in Example 3 except that the wavelength employed in the measurement was altered to $\lambda_{max}$=558 nm, and at the same time, an optical disk was manufactured to measure the ratio of jitter, the results being shown in Table 2.

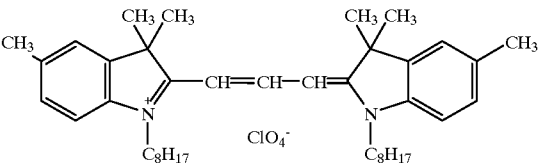

[42]

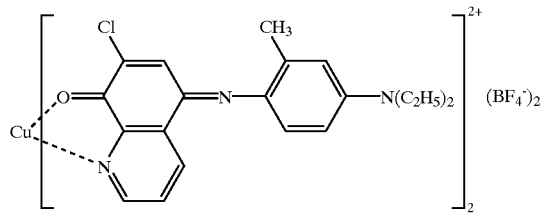

[43]

EXAMPLE 12

Figure 21:
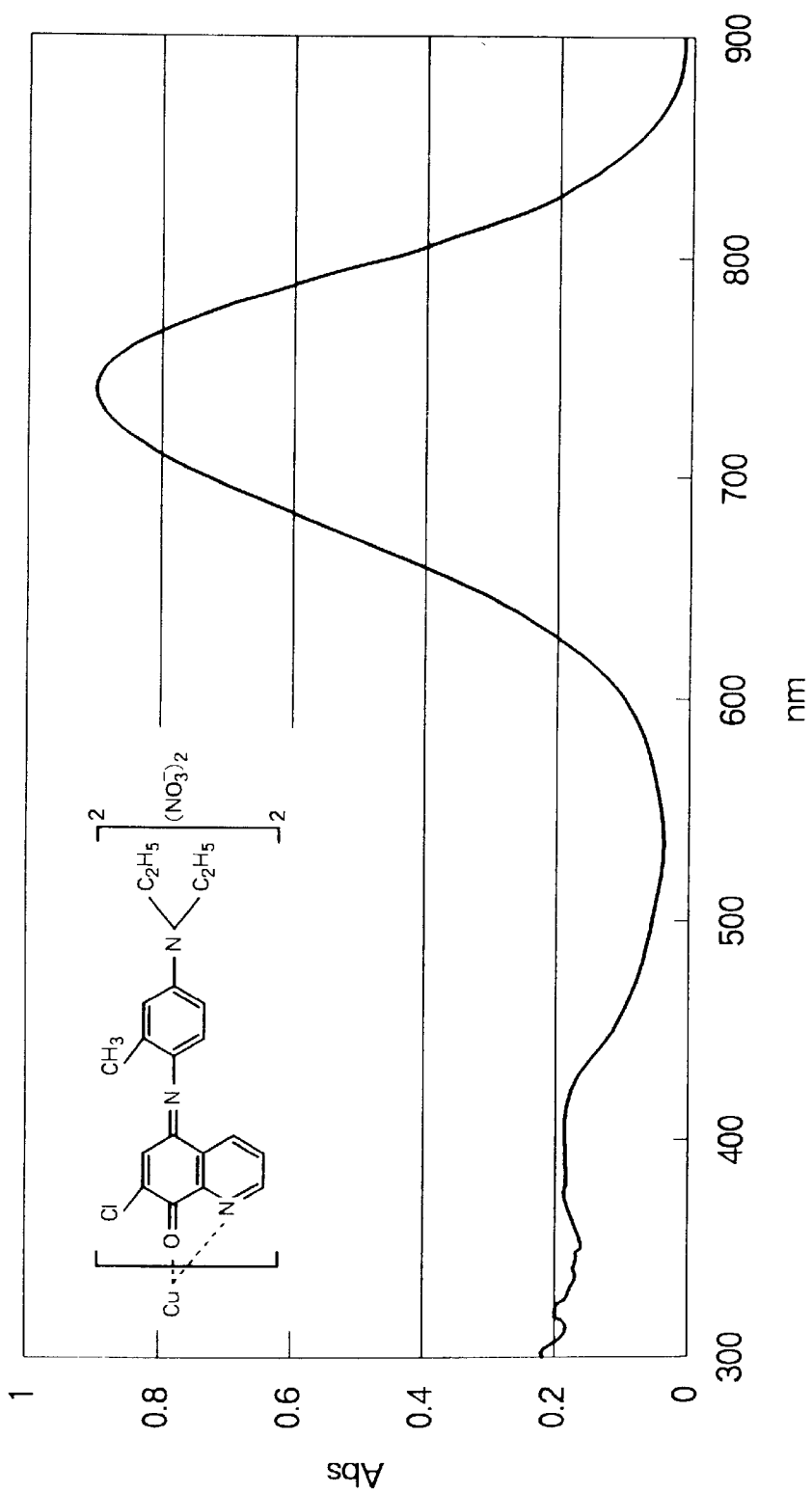
FIG. 21 is a graph showing the absorption spectrum of a naphthalenone derivative dye employed as an organometallic dye compound in the twelfth example of this invention.

A disk provided with a light interference layer consisting of a photo-sensitive dye film as well as an optical disk were manufactured in the same manner as illustrated in Example 11 except that a naphthalenone derivative exhibiting an absorption spectrum (in an ethanol solution) as shown in FIG. 21 and a maximum absorption wavelength $\lambda_{max}$ of 742 nm, and represented by the following general formula [44] was substituted for the naphthalenone derivative exhibiting an absorption spectrum shown in FIG. 20. The measurements with respect to the residual absorption ratio of dye and to the ratio of jitter were performed on these disks. The results of measurements obtained are shown in Table 2.

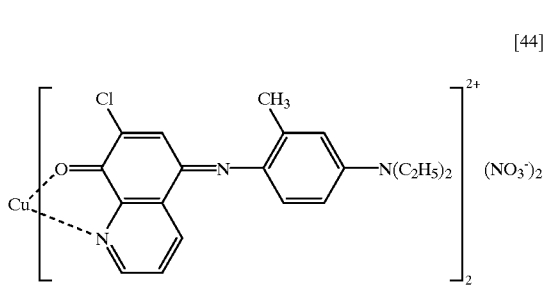

[44]

COMPARATIVE EXAMPLE 5

A disk provided with a light interference layer consisting of a photo-sensitive dye film as well as an optical disk were manufactured in the same manner as illustrated in Example 3 except that a naphthalenone derivative exhibiting an absorption spectrum as shown in FIG. 11 and represented by the aforementioned general formula [34] was not employed. The measurements with respect to the residual absorption ratio of dye and to the ratio of jitter were performed on these disks. The results of measurements obtained are shown in Table 2. As seen from Table 2, although the residual absorption ratio of dye was found as being a little higher than a half of those of Comparative Examples 1 and 2, since the exposure time was four times as long as those of Comparative Examples 1 and 2, the actual residual absorption ratio of dye of this comparative example was about twice as excellent as that of

COMPARATIVE EXAMPLE 1

This comparative example is related to one example of the DVD-R optical disk. However, since the organometallic dye compound was not employed, the residual absorption ratio of dye was low, and a deterioration in terms of jitter was recognized due to the discoloration of the cyanine dye.

COMPARATIVE EXAMPLE 6

Figure 22:
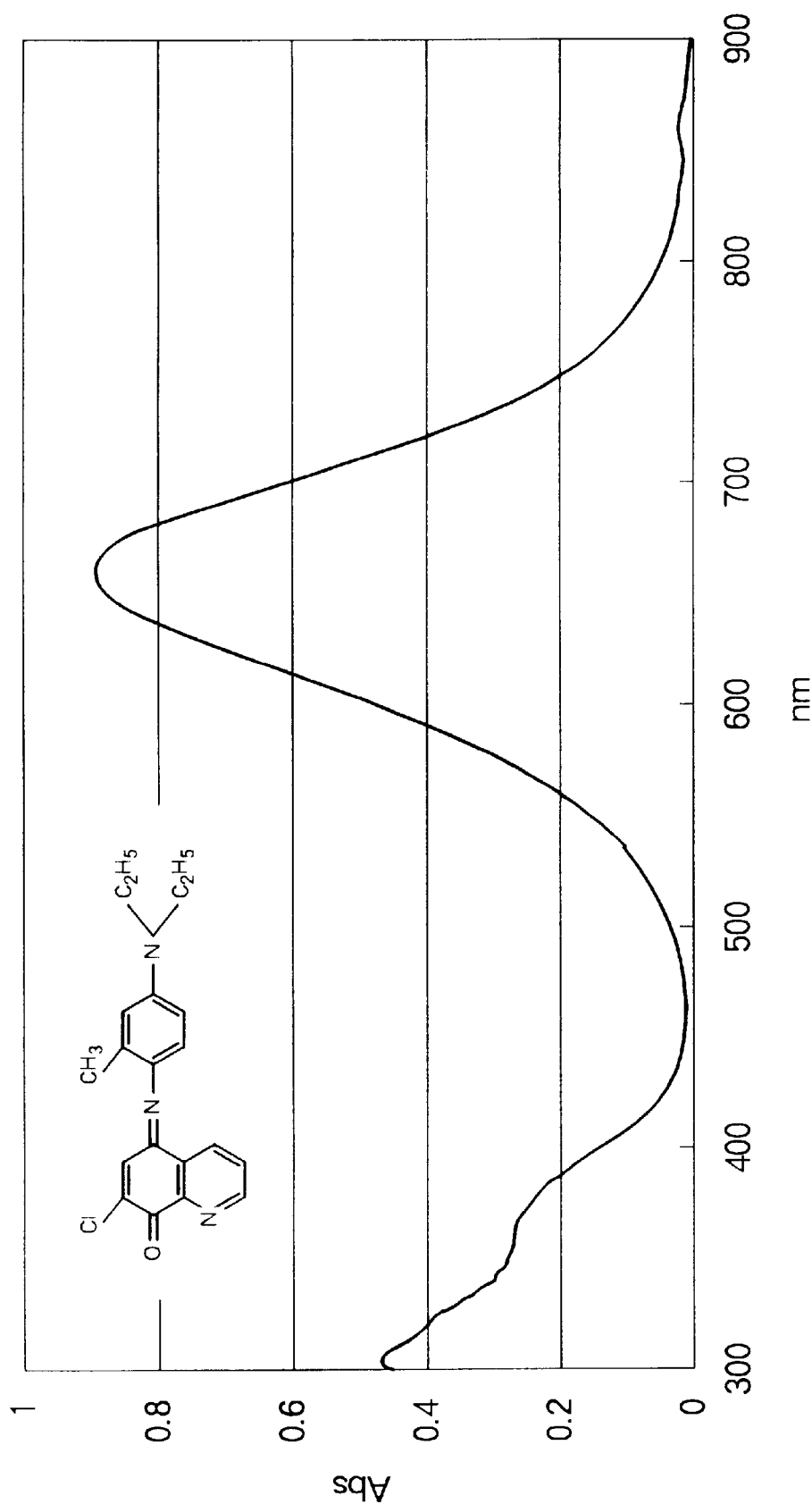
FIG. 22 is a graph showing the absorption spectrum of a naphthalenone derivative dye containing no metal and employed in the sixth comparative example.

A disk provided with a light interference layer consisting of a photo-sensitive dye film as well as an optical disk were manufactured in the same manner as illustrated in Example 3 except that a compound exhibiting an absorption spectrum (in a chloroform solution) as shown in FIG. 22 and a maximum absorption wavelength $\lambda_{max}$ of 658 nm, and represented by the following general formula [45] was substituted for the naphthalenone derivative exhibiting an absorption spectrum shown in FIG. 11 and represented by the aforementioned general formula [34]. The measurements with respect to the residual absorption ratio of dye and to the ratio of jitter were performed on these disks. The results of measurements obtained are shown in Table 2.

This comparative example is related to one example of the DVD-R optical disk. However, since the organometallic dye compound was not employed, the residual absorption ratio of dye was low, and the ratio of jitter was found far inferior as compared with that of Example 3 due to the discoloration of the cyanine dye, even if a naphthalenone derivative containing no transition metal was employed in this comparative example.

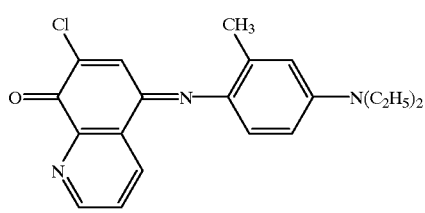

[45]

By the way, the naphthalenone derivatives belonging to the aforementioned general formulas [30] and [31] were easily manufactured by the method set forth in the document: "Yoshida, Chemistry Letters pp.1563–1566, 1987", thereby obtaining the chemical structures and spectrums of the naphthalenone derivatives employed in Example 3 and later examples and shown in FIG. 9 and later Figures.

In view of these results and the aforementioned description, this invention (the cases where the compounds belonging to the aforementioned general formula [31] is employed) may be limited by the constituent features that "the residual absorption ratio of dye is not less than 88%, and jitter is less than 7.2 (more preferably not more than 7)", or by the constituent features that "the residual absorption ratio of dye is improved by at least 2.75 times larger as compared with where a naphthalenone derivative containing no metal is employed, or improved by at least 3.52 times as compared with where a naphthalenone derivative is not employed, and jitter is less than 7.2 (more preferably not more than 7)" as measured under the aforementioned measuring conditions.

By the way, it is possible according to this invention to employ various kinds of cyanine dyes and organometallic dye compounds other than those described in the above examples.

As explained above, according to this invention, since a heat mode recording organic dye is co-used with an organometallic dye compound whose absorption spectrum curve intersects with the absorption spectrum curve of the recording organic dye and whose maximum absorption wavelength exists on a longer wavelength side in relative to the maximum absorption wavelength of the recording organic dye, it is possible to prevent the optical degradation of the recording layer during a long term of storage. Furthermore, since the absorption energy of sunlight by the heat mode recording dye can be reduced thereby to prevent the optical deterioration thereof without deteriorating the recording and reproducing performance thereof, it is no more required to employ any additional stabilizing radicals or quenchers, thus making it possible to provide an optical information recording medium which exhibits an excellent light stability when it is employed in a DVD-R which is capable of recording or reproducing with a laser of 600 to 660 nm in wavelength and can be manufactured without extremely modifying the conventional manufacturing method of the CD-R or DVD-R.

TABLE 1

|  | RESIDUAL ABSORPTION RATIO OF DYE (%) | RATIO OF JITTER (%) | BLER (cps) |
|---|---|---|---|
| EXAMPLE 3 | 90 | 5 | — |
| EXAMPLE 2 | 90 | — | 5 |
| COMP. EX 1 | 48 | 16 | — |
| COMP. EX 2 | 47 | — | 500 |
| COMP. EX 3 | 75 | 8 | — |
| COMP. EX 4 | 82 | 7 | — |

RESIDUAL ABSORPTION RATIO OF DYE: ABSORBENCY AT λ MAX (%)
RATIO OF JITTER: DATA CLOCK JITTER
BLER: AVERAGE ERROR RATE AS MEASURED FOR 5 MIN

TABLE 2

|  | RESIDUAL ABSORPTION RATIO OF DYE (%) | RATIO OF JITTER BEFORE EXPOSURE (%) | RATIO OF JITTER AFTER EXPOSURE (%) |
|---|---|---|---|
| EXAMPLE 3 | 88 | 7.0 | 7.8 |
| EXAMPLE 4 | 92 | 7.0 | 7.4 |
| EXAMPLE 5 | 90 | 7.1 | 7.6 |
| EXAMPLE 6 | 90 | 7.1 | 7.5 |
| EXAMPLE 7 | 92 | 7.0 | 7.4 |
| EXAMPLE 8 | 92 | 7.0 | 7.4 |
| EXAMPLE 9 | 91 | 7.0 | 7.4 |
| EXAMPLE 10 | 92 | 7.0 | 7.4 |
| EXAMPLE 11 | 92 | 7.0 | 7.4 |
| EXAMPLE 12 | 92 | 7.0 | 7.4 |
| COMP. EX 5 | 25 | 7.3 | 16.3 |
| COMP. EX 6 | 32 | 7.2 | 15.8 |

RESIDUAL ABSORPTION RATIO OF DYE: ABSORBENCY AT λ MAX (%)
RATIO OF JITTER: DATA CLOCK JITTER

What is claimed is:
1. An optical information recording medium provided on a substrate thereof with a light interference layer comprising a heat mode recording organic dye and an organometallic dye compound containing a metal or a metallic ion, wherein an absorption spectrum curve of said recording organic dye is intersected with an absorption spectrum curve of said organometallic dye compound, and wherein said organometallic dye compound exhibits a maximum absorption wavelength on a longer wavelength side relative to a maximum absorption wavelength of said recording organic dye; wherein said recording organic dye is a cyanine dye represented by the following formula (1);

(1)
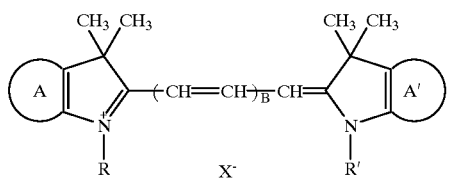

wherein "A" represents anyone of the following formulas (2), (3), (4) and (30);

(2)
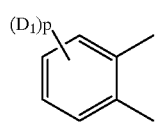

(3)
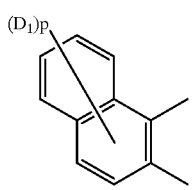

(4)
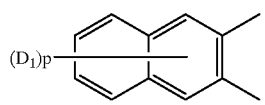

(5)
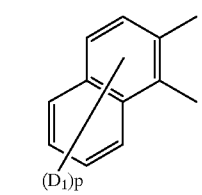

wherein "A'" represents any one of the following formulas (6), (7), (8) and (9);

(6)
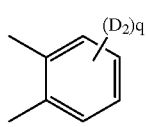

(7)
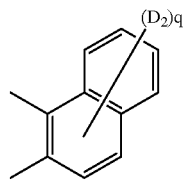

(8)
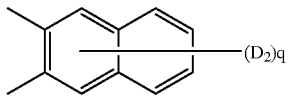

(9)
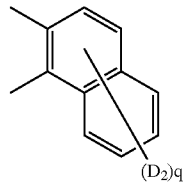

wherein "A" and "A'" may be the same or different from each other, where D1 and D2 may be the same or different from each other and are individually hydrogen atom, alkyl, alkoxy, hydroxyl, halogen atoms, carboxyl, alkoxycarboxyl, alkylcarboxyl, alkylhydroxyl, aralkyl, alkenyl, alkylamide, alkylamino, alkylsulfonamide, alkylcarbamoyl, alkylsufamoyl, alkylsulfonyl, phenyl, cyano, ester, nitro, acyl, allyl, aryl, aryloxy, alkylthio, arylthio, phenylazo, pyridinoazo, alkylcarbonylamino, sulfonamide, amino, alkylsulfone, thiocyano, mercapto, chlorosulfone, alkylazomethine, alkylaminosulfone, vinyl or sulfone group; p and q respectively represents an integer of 1 or more; R and R' may be the same or different from each other and are individually substituted or unsubstituted alkyl, carboxyl, alkoxycarbonyl, alkoxycarboxyl, alkoxyl, alkylhydroxyl, aralkyl, alkenyl, alkylamide, alkylamino, alkylsufonamide, alkylcarbamoyl, alkylsulfamoyl, hydroxyl, halogen atoms, alkylalkoxy, alkyl halide, alkylsulfonyl, alkylcarboxyl or alkylsulfonyl which are bonded to a metallic ion or alkyl, phenyl, benzyl or alkylphenyl group; X⁻ is an anion selected from the group consisting of halogen atoms, $PF_6^-$, $SbF_6^-$, $H_3PO_4$, perchloric acid, hydroborofluoric acid, benzenesulfonic acid, toluenesulfonic acid, alkylsulfonic acid, benzenecarboxylic acid, alkylcarboxylic acid, trifluoromethylcarboxylic acid, periodic acid and SCN⁻; and B is an integer of 1 or 2;

with the proviso that the organometallic dye compound at least includes a pyridophenothiazine compound or a naphthalenone compound.

2. The optical information recording medium according to any one of claim 1, wherein said metal or metallic ion is a transition metal.

3. The optical recording medium according to claim 1, wherein said metal or metallic ion is at least one kind of metal or metallic ion selected from the group consisting of Ni, Cu, Mn, Co, V, Mo and Fe; and said organometallic dye compound is a naphthalenone compound.

4. The optical information recording medium according to claim 3, wherein said metal or metallic ion is at least one kind of metal or metallic ion selected from the group consisting of Ni, Cu, Mn, Co, V, Mo and Fe; and said naphthalenone compound is represented by the following formula (30):

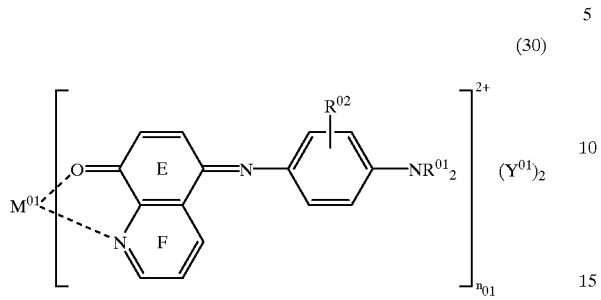

(30)

wherein $M^{01}$ is a metal or metallic ion selected from the group consisting of Ni, Cu, Mn, Co, V, Mo and Fe; E and F may be provided with a substituent group; $R_{01}$s of $R^{01}{}_2$ may be the same or different from each other and are individually hydrogen atom, lower alkyl group, alkoxy group, alkenyl group or cycloalkyl group, each accompanying or not accompanying a substituent group; $R^{02}$ is hydrogen atom, halogen atom, lower alkyl group, alkoxy group, alkylsulfonyl amino group, alkoxycarbonyl amino group, or acylamino group, each accompanying or not accompanying a substituent group; $Y^{01}$ represents an anion selected from the group consisting of halogen ion, $ClO_4^-$, $BF_4^-$, $PF_6^-$, $SbF_6^-$, $NO_3^-$, $CH_3COO^-$, $SO_4^{--}$, $ArSO_3^-$, wherein Ar is a substituted or unsubstituted aromatic ring, $RSO_3^-$, wherein R is a substituted or unsubstituted lower alkyl group; and $n_{01}$ is an integer of 1 or 2.

5. The optical information recording medium according to claim 4 wherein said compound represented by the formula (30) is a compound represented by the following formula (10):

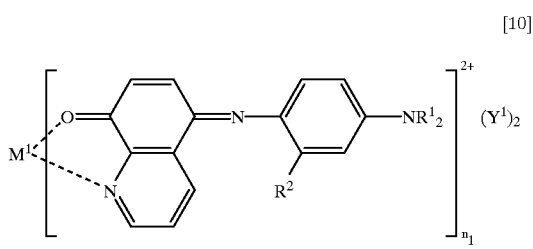

[10]

wherein $M^1$, $R^1$ of $R^1{}_2$, $R^2$, $Y^1$ and $n_1$ are the same in definition as those of $M^{01}$, $R^{01}$ of $R^{01}{}_2$, $R^{02}$, $Y^{02}$ and $n_{01}$ of said formula (30), respectively.

6. The optical recording medium according to claim 5 wherein said compound represented by the formula (10) is selected from those where $R^1$s of $R^1{}_2$ are the same or different from each other and are individually lower alkyl group; $R^2$ is hydrogen atom or lower alkyl group; and $Y^1$ is a compound representing an anion selected from the group consisting of halogen ion, $ClO_4^-$, $BF_4^-$, $PF_6^-$, and $SbF_6^-$.

7. The optical information recording medium according to claim 6, wherein $R^1$ is an ethyl group and $R^2$ is a methyl group.

8. The optical information recording medium according to claim 4 wherein said compound represented by the formula (30) is compound represented by the following formula (11):

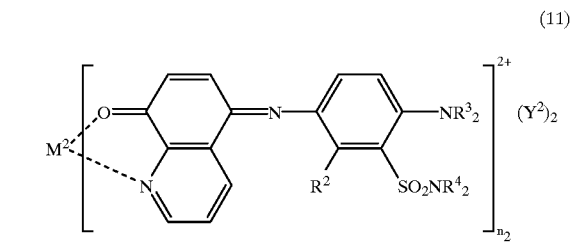

(11)

wherein $M^2$, $R^3$ of $R^3{}_2$, $Y^2$ and $n_2$ are the same in definition as those of $M^{01}$, $R^{01}$ of $R^{01}{}_2$, $Y^{01}$ and $n_{01}$ of the aforementioned formula (30), respectively; and $R^4$s of $R^4{}_2$ are the same or different from each other and are individually lower alkyl group.

9. The optical information recording medium according to claim 8 wherein said compound represented by the formula (11) is selected from those where $R^3$s of $R^3{}_2$ are the same or different from each other and are individually lower alkyl group; and $Y^2$ is a compound representing an anion selected from the group consisting of halogen ion, $ClO_4^-$, $BF_4^-$, $PF_6^-$ and $SbF_6^-$.

10. The optical information recording medium according to claim 9, wherein $R^3$ is an ethyl group.

11. The optical information recording medium according to claim 8, wherein $R^4$ is an ethyl group.

12. The optical information recording medium according to claim 4 wherein said metal or metallic ion is at least one kind of metal or metallic ion selected from the group consisting of Ni, Cu, Mn, Co, V, Mo, and Fe; and said naphthalenone compound is represented by the following formula (31):

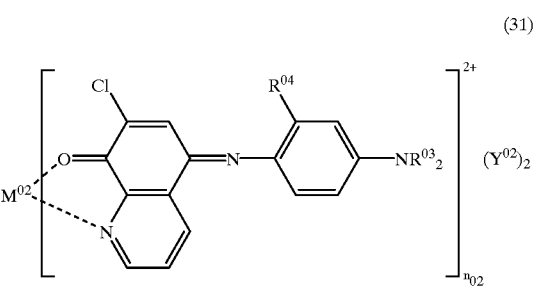

(31)

wherein $M^{02}$, $R^{03}$, $R^{03}{}_2$, $R^{04}$, $Y^{02}$ and $n_{02}$ are the same in definition as those of $M^{01}$, $R^{01}$ of $R^{01}{}_2$, $R^{02}$, $Y^{01}$ and $n_{01}$ of the aforementioned formula (30), respectively.

13. The optical recording medium according to claim 1, wherein said metal or metallic ion is at least one kind of metal or metallic ion selected from the group consisting of Ni, Cu, Mn, Co, V, Mo and Fe; and said organometallic dye compound is a naphthalenone compound and a pyridophenothiazine compound.

14. The optical information. recording medium according to claim 13, wherein said pyridophenothiazine compound is represented by the following formula (12):

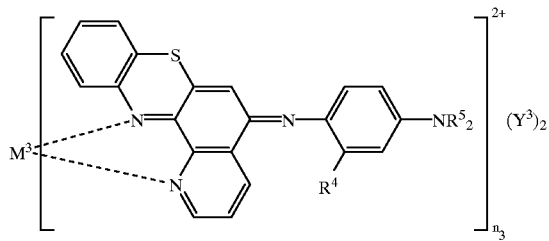

wherein M³ is a metal or a metallic ion selected from the group consisting of Ni, Cu, Mn, Co, V, Mo and Fe; R⁵s of $R^5_2$ may be the same or different from each other and are individually a lower alkyl group; $R^6$ is a hydrogen atom, lower alkyl group; $Y^3$ represents an anion selected from the group consisting of halogen ion, $ClO_4^-$, $BF_4^-$, $PF_6^-$ and $SbF_6^-$; and $n_3$ is an integer of 1 or 2.

15. The optical information recording medium according to claim 14, wherein $R^5$ is an ethyl group and $R^6$ is a methyl group.

16. The optical information recording medium according to claim 1, wherein said recording medium is an optical disk which is capable of recording or reproducing data by means of a laser beam of 620 to 690 nm in wavelength.

* * * * *